United States Patent
Nelson et al.

(10) Patent No.: US 12,087,133 B2
(45) Date of Patent: *Sep. 10, 2024

(54) METHODS AND APPARATUS FOR PROVIDING SECURE LOGON TO A GAMING MACHINE USING A MOBILE DEVICE

(71) Applicant: IGT, Las Vegas, NV (US)

(72) Inventors: Dwayne R Nelson, Las Vegas, NV (US); Steven G. LeMay, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,681

(22) Filed: Nov. 16, 2023

(65) Prior Publication Data

US 2024/0087406 A1    Mar. 14, 2024

Related U.S. Application Data

(63) Continuation of application No. 18/380,989, filed on Oct. 17, 2023, which is a continuation of application No. 17/487,529, filed on Sep. 28, 2021, now Pat. No. 11,798,360, which is a continuation of application No. 16/456,696, filed on Jun. 28, 2019, now Pat. No. 11,164,419, which is a continuation of application No. 16/000,240, filed on Jun. 5, 2018, now Pat. No. 10,706,677, which is a continuation of application No. 15/270,828, filed on Sep. 20, 2016, now Pat. No. 10,013,850, which is a continuation of application
(Continued)

(51) Int. Cl.
*G07F 17/32* (2006.01)
*A63F 9/24* (2006.01)

(52) U.S. Cl.
CPC ............ *G07F 17/3241* (2013.01); *A63F 9/24* (2013.01); *G07F 17/32* (2013.01); *G07F 17/3209* (2013.01); *G07F 17/3211* (2013.01); *G07F 17/3223* (2013.01); *G07F 17/3225* (2013.01); *G07F 17/3239* (2013.01); *G07F 17/3251* (2013.01); *A63F 2009/2457* (2013.01)

(58) Field of Classification Search
None
See application file for complete search history.

(56) References Cited

U.S. PATENT DOCUMENTS

| | | |
|---|---|---|
| 3,662,105 A | 5/1972 | Hurst et al. |
| 4,071,689 A | 1/1978 | Talmage et al. |
| (Continued) | | |

FOREIGN PATENT DOCUMENTS

| | | |
|---|---|---|
| EP | 1622104 A2 | 2/2006 |
| EP | 1837061 A2 | 9/2007 |
| (Continued) | | |

OTHER PUBLICATIONS

Non-Final Action cited in Reexam U.S. Appl. No. 90/015,118, filed Jun. 23, 2023.
(Continued)

*Primary Examiner* — Seng H Lim
(74) *Attorney, Agent, or Firm* — Neal, Gerber & Eisenberg LLP

(57) ABSTRACT

A gaming system compatible with patron-controlled portable electronic devices, such as smart phones or tablet computers.

25 Claims, 6 Drawing Sheets

Related U.S. Application Data

No. 14/875,469, filed on Oct. 5, 2015, now Pat. No. 9,852,578, which is a continuation of application No. 14/181,372, filed on Feb. 14, 2014, now Pat. No. 9,875,607, which is a continuation-in-part of application No. 13/478,551, filed on May 23, 2012, now abandoned, and a continuation-in-part of application No. 13/181,725, filed on Jul. 13, 2011, now abandoned.

(56) References Cited

U.S. PATENT DOCUMENTS

| | | |
|---|---|---|
| 4,072,930 A | 2/1978 | Lucero et al. |
| 4,283,709 A | 8/1981 | Lucero et al. |
| 4,339,709 A | 7/1982 | Brihier |
| 4,339,798 A | 7/1982 | Hedges et al. |
| 4,553,222 A | 11/1985 | Kurland et al. |
| 4,856,787 A | 8/1989 | Itkis |
| 5,038,022 A | 8/1991 | Lucero |
| 5,042,809 A | 8/1991 | Richardson |
| 5,048,831 A | 9/1991 | Sides |
| 5,179,517 A | 1/1993 | Sarbin et al. |
| 5,221,838 A | 6/1993 | Gutman et al. |
| 5,371,345 A | 12/1994 | Lestrange et al. |
| 5,429,361 A | 7/1995 | Raven et al. |
| 5,457,306 A | 10/1995 | Lucero |
| 5,470,079 A | 11/1995 | Lestrange et al. |
| 5,483,049 A | 1/1996 | Schulze |
| 5,559,312 A | 9/1996 | Lucero |
| 5,618,045 A | 4/1997 | Kagan et al. |
| 5,643,086 A | 7/1997 | Alcorn et al. |
| 5,655,961 A | 8/1997 | Acres et al. |
| 5,676,231 A | 10/1997 | Legras et al. |
| 5,702,304 A | 12/1997 | Acres et al. |
| 5,718,632 A | 2/1998 | Hayashi |
| 5,741,183 A | 4/1998 | Acres et al. |
| 5,759,102 A | 6/1998 | Pease et al. |
| 5,761,647 A | 6/1998 | Boushy |
| 5,768,382 A | 6/1998 | Schneier et al. |
| 5,769,716 A | 6/1998 | Saffari et al. |
| 5,770,533 A | 6/1998 | Franchi |
| 5,779,545 A | 7/1998 | Berg et al. |
| 5,788,573 A | 8/1998 | Baerlocher et al. |
| 5,795,228 A | 8/1998 | Trumbull et al. |
| 5,796,389 A | 8/1998 | Bertram et al. |
| 5,797,085 A | 8/1998 | Beuk et al. |
| 5,809,482 A | 9/1998 | Strisower |
| 5,811,772 A | 9/1998 | Lucero |
| 5,816,918 A | 10/1998 | Kelly et al. |
| 5,818,019 A | 10/1998 | Irwin et al. |
| 5,833,536 A | 11/1998 | Davids et al. |
| 5,833,540 A | 11/1998 | Miodunski et al. |
| 5,836,819 A | 11/1998 | Ugawa |
| 5,851,148 A | 12/1998 | Brune et al. |
| 5,871,398 A | 2/1999 | Schneier et al. |
| D406,612 S | 3/1999 | Johnson |
| 5,885,158 A | 3/1999 | Torango et al. |
| 5,919,091 A | 7/1999 | Bell et al. |
| 5,951,397 A | 9/1999 | Dickinson |
| 5,952,640 A | 9/1999 | Lucero |
| 5,954,583 A | 9/1999 | Green |
| 5,957,776 A | 9/1999 | Hoehne |
| 5,959,277 A | 9/1999 | Lucero |
| 5,967,896 A | 10/1999 | Jorasch et al. |
| 5,971,271 A | 10/1999 | Wynn et al. |
| 5,984,779 A | 11/1999 | Bridgeman et al. |
| 5,999,808 A | 12/1999 | Ladue |
| 6,001,016 A | 12/1999 | Walker et al. |
| 6,003,013 A | 12/1999 | Boushy et al. |
| 6,003,651 A | 12/1999 | Waller et al. |
| 6,010,404 A | 1/2000 | Walker et al. |
| 6,012,832 A | 1/2000 | Saunders et al. |
| 6,012,983 A | 1/2000 | Walker et al. |
| 6,019,283 A | 2/2000 | Lucero |
| 6,038,666 A | 3/2000 | Hsu et al. |
| 6,048,269 A | 4/2000 | Burns et al. |
| 6,050,895 A | 4/2000 | Luciano et al. |
| 6,062,981 A | 5/2000 | Luciano |
| 6,068,552 A | 5/2000 | Walker et al. |
| 6,077,163 A | 6/2000 | Walker et al. |
| 6,089,975 A | 7/2000 | Dunn |
| 6,099,408 A | 8/2000 | Schneier et al. |
| 6,104,815 A | 8/2000 | Alcorn et al. |
| 6,106,396 A | 8/2000 | Alcorn et al. |
| 6,110,041 A | 8/2000 | Walker et al. |
| 6,113,492 A | 9/2000 | Walker et al. |
| 6,113,493 A | 9/2000 | Walker et al. |
| 6,113,495 A | 9/2000 | Walker et al. |
| 6,135,884 A | 10/2000 | Hedrick et al. |
| 6,135,887 A | 10/2000 | Pease et al. |
| 6,139,431 A | 10/2000 | Walker et al. |
| 6,141,711 A | 10/2000 | Shah et al. |
| 6,142,369 A | 11/2000 | Jonstromer |
| 6,149,522 A | 11/2000 | Alcorn et al. |
| 6,161,059 A | 12/2000 | Tedesco et al. |
| 6,162,121 A | 12/2000 | Morro et al. |
| 6,162,122 A | 12/2000 | Acres et al. |
| 6,174,234 B1 | 1/2001 | Seibert et al. |
| 6,182,221 B1 | 1/2001 | Hsu et al. |
| 6,183,362 B1 | 2/2001 | Boushy |
| 6,190,256 B1 | 2/2001 | Walker et al. |
| 6,206,283 B1 | 3/2001 | Bansal et al. |
| 6,210,279 B1 | 4/2001 | Dickinson |
| 6,223,166 B1 | 4/2001 | Kay |
| 6,227,972 B1 | 5/2001 | Walker et al. |
| 6,244,958 B1 | 6/2001 | Acres |
| 6,247,643 B1 | 6/2001 | Lucero |
| 6,253,119 B1 | 6/2001 | Dabrowski |
| 6,264,560 B1 | 7/2001 | Goldberg et al. |
| 6,264,561 B1 | 7/2001 | Saffari et al. |
| 6,267,671 B1 | 7/2001 | Hogan |
| 6,270,410 B1 | 8/2001 | Demar et al. |
| 6,280,328 B1 | 8/2001 | Holch et al. |
| 6,285,868 B1 | 9/2001 | Ladue |
| 6,293,866 B1 | 9/2001 | Walker et al. |
| 6,302,790 B1 | 10/2001 | Brossard |
| 6,307,956 B1 | 10/2001 | Black |
| 6,319,125 B1 | 11/2001 | Acres |
| 6,341,353 B1 | 1/2002 | Herman et al. |
| 6,368,216 B1 | 4/2002 | Hedrick et al. |
| 6,371,852 B1 | 4/2002 | Acres |
| 6,378,073 B1 | 4/2002 | Davis et al. |
| 6,379,246 B1 | 4/2002 | Dabrowski |
| 6,383,076 B1 | 5/2002 | Tiedeken |
| 6,409,595 B1 | 6/2002 | Uihlein et al. |
| 6,409,602 B1 | 6/2002 | Wiltshire et al. |
| 6,443,843 B1 | 9/2002 | Walker et al. |
| 6,450,885 B2 | 9/2002 | Schneier et al. |
| 6,488,585 B1 | 12/2002 | Wells et al. |
| 6,496,928 B1 | 12/2002 | Deo et al. |
| 6,530,835 B1 | 3/2003 | Walker et al. |
| 6,561,903 B2 | 5/2003 | Walker et al. |
| 6,581,161 B1 | 6/2003 | Byford |
| 6,582,310 B1 | 6/2003 | Walker et al. |
| 6,585,598 B2 | 7/2003 | Nguyen et al. |
| 6,628,939 B2 | 9/2003 | Paulsen |
| 6,634,550 B1 | 10/2003 | Walker et al. |
| 6,648,761 B1 | 11/2003 | Izawa et al. |
| 6,676,522 B2 | 1/2004 | Rowe et al. |
| 6,682,421 B1 | 1/2004 | Rowe et al. |
| 6,685,567 B2 | 2/2004 | Cockerille et al. |
| 6,702,670 B2 | 3/2004 | Jasper et al. |
| 6,739,975 B2 | 5/2004 | Nguyen et al. |
| 6,758,393 B1 | 7/2004 | Luciano et al. |
| 6,800,029 B2 | 10/2004 | Rowe et al. |
| 6,846,238 B2 | 1/2005 | Wells |
| 6,869,362 B2 | 3/2005 | Walker et al. |
| 6,880,079 B2 | 4/2005 | Kefford et al. |
| 6,896,618 B2 | 5/2005 | Benoy et al. |
| 6,905,411 B2 | 6/2005 | Nguyen et al. |
| 6,969,319 B2 | 11/2005 | Rowe et al. |
| 7,004,388 B2 | 2/2006 | Kohta |
| 7,004,837 B1 | 2/2006 | Crowder et al. |
| 7,147,558 B2 | 12/2006 | Giobbi |

(56) References Cited

U.S. PATENT DOCUMENTS

| | | | |
|---|---|---|---|
| 7,153,210 B2 | 12/2006 | Yamagishi | |
| 7,167,724 B2 | 1/2007 | Yamagishi | |
| 7,178,034 B2 | 2/2007 | Cihula et al. | |
| 7,275,991 B2 | 10/2007 | Burns et al. | |
| 7,329,186 B2* | 2/2008 | Griswold | G07F 17/3223 463/43 |
| 7,331,520 B2 | 2/2008 | Silva et al. | |
| 7,335,106 B2 | 2/2008 | Johnson | |
| 7,337,330 B2 | 2/2008 | Gatto et al. | |
| 7,341,522 B2 | 3/2008 | Yamagishi | |
| 7,416,485 B2 | 8/2008 | Walker et al. | |
| 7,419,428 B2 | 9/2008 | Rowe | |
| 7,467,999 B2 | 12/2008 | Walker et al. | |
| 7,477,889 B2 | 1/2009 | Kim | |
| 7,510,474 B2 | 3/2009 | Carter | |
| 7,545,522 B1 | 6/2009 | Lou | |
| 7,546,373 B2 | 6/2009 | Lehew et al. | |
| 7,552,341 B2 | 6/2009 | Chen et al. | |
| 7,594,855 B2 | 9/2009 | Meyerhofer | |
| 7,611,409 B2 | 11/2009 | Muir et al. | |
| 7,644,861 B2 | 1/2010 | Alderucci et al. | |
| 7,693,306 B2 | 4/2010 | Huber | |
| 7,699,703 B2 | 4/2010 | Muir et al. | |
| 7,753,789 B2 | 7/2010 | Walker et al. | |
| 7,758,420 B2 | 7/2010 | Saffari | |
| 7,771,271 B2 | 8/2010 | Walker et al. | |
| 7,785,193 B2 | 8/2010 | Paulsen et al. | |
| 7,846,017 B2 | 12/2010 | Walker et al. | |
| 7,850,522 B2 | 12/2010 | Walker et al. | |
| 7,883,417 B2 | 2/2011 | Bruzzese et al. | |
| 7,950,996 B2 | 5/2011 | Nguyen et al. | |
| 7,988,550 B2 | 8/2011 | White | |
| 7,997,972 B2 | 8/2011 | Nguyen et al. | |
| 8,016,666 B2 | 9/2011 | Angell et al. | |
| 8,023,133 B2 | 9/2011 | Kaneko | |
| 8,038,527 B2 | 10/2011 | Walker et al. | |
| 8,057,303 B2 | 11/2011 | Rasmussen et al. | |
| 8,079,904 B2 | 12/2011 | Griswold et al. | |
| 8,096,872 B2 | 1/2012 | Walker et al. | |
| 8,118,668 B2 | 2/2012 | Gagner et al. | |
| 8,144,356 B2 | 3/2012 | Meyerhofer | |
| 8,157,642 B2 | 4/2012 | Paulsen | |
| 8,192,276 B2 | 6/2012 | Walker et al. | |
| 8,219,129 B2 | 7/2012 | Brown et al. | |
| 8,220,019 B2 | 7/2012 | Stearns et al. | |
| 8,256,664 B1 | 9/2012 | Belfanz | |
| 8,282,465 B2 | 10/2012 | Giobbi | |
| 8,282,490 B2 | 10/2012 | Arezina et al. | |
| 8,286,856 B2 | 10/2012 | Meyerhofer et al. | |
| 8,333,655 B2* | 12/2012 | Gagner | G07F 17/3209 463/25 |
| 8,393,955 B2 | 3/2013 | Arezina et al. | |
| 8,419,548 B2 | 4/2013 | Gagner et al. | |
| 8,469,800 B2 | 6/2013 | Lemay et al. | |
| 8,512,144 B2 | 8/2013 | Johnson et al. | |
| 8,550,903 B2 | 10/2013 | Lyons et al. | |
| 8,597,108 B2 | 12/2013 | Nguyen | |
| 8,597,111 B2 | 12/2013 | Lemay et al. | |
| 8,602,875 B2 | 12/2013 | Nguyen | |
| 8,608,569 B2 | 12/2013 | Carrico et al. | |
| 8,613,659 B2 | 12/2013 | Nelson et al. | |
| 8,613,668 B2 | 12/2013 | Nelson et al. | |
| 8,616,981 B1 | 12/2013 | Guinn et al. | |
| 8,622,836 B2 | 1/2014 | Nelson et al. | |
| 8,627,438 B1 | 1/2014 | Bhimanaik | |
| 8,721,434 B2 | 5/2014 | Nelson et al. | |
| 8,734,236 B2 | 5/2014 | Arezina et al. | |
| 8,827,813 B2 | 9/2014 | Lemay et al. | |
| 8,827,814 B2 | 9/2014 | Lemay et al. | |
| 8,845,422 B2 | 9/2014 | Weber | |
| 8,876,595 B2 | 11/2014 | Nelson et al. | |
| 8,888,586 B2 | 11/2014 | Hsu | |
| 8,932,140 B2 | 1/2015 | Gagner et al. | |
| 8,956,222 B2 | 2/2015 | Lemay et al. | |
| 8,961,306 B2 | 2/2015 | Lemay et al. | |
| 9,011,236 B2 | 4/2015 | Nelson et al. | |
| 9,153,095 B2 | 10/2015 | Adiraju et al. | |
| 10,013,850 B2* | 7/2018 | Nelson | G07F 17/3239 |
| 10,052,551 B2 | 8/2018 | Nguyen | |
| 10,395,465 B2* | 8/2019 | Bytnar | H04W 12/06 |
| 10,706,677 B2* | 7/2020 | Nelson | G07F 17/3223 |
| 11,430,284 B2 | 8/2022 | Shepherd | |
| 2001/0039204 A1 | 11/2001 | Tanskanen | |
| 2001/0044337 A1 | 11/2001 | Rowe et al. | |
| 2002/0020603 A1 | 2/2002 | Jones et al. | |
| 2002/0061778 A1 | 5/2002 | Acres | |
| 2002/0077182 A1 | 6/2002 | Swanberg et al. | |
| 2002/0082070 A1 | 6/2002 | Macke et al. | |
| 2002/0087641 A1 | 7/2002 | Levosky | |
| 2002/0090986 A1 | 7/2002 | Cote et al. | |
| 2002/0094869 A1 | 7/2002 | Harkham | |
| 2002/0107066 A1 | 8/2002 | Seelig et al. | |
| 2002/0111206 A1 | 8/2002 | Van et al. | |
| 2002/0111209 A1 | 8/2002 | Walker et al. | |
| 2002/0145035 A1 | 10/2002 | Jones | |
| 2002/0147047 A1 | 10/2002 | Letovsky et al. | |
| 2002/0147049 A1 | 10/2002 | Carter | |
| 2002/0163570 A1 | 11/2002 | Phillips | |
| 2002/0169623 A1 | 11/2002 | Call et al. | |
| 2002/0183046 A1 | 12/2002 | Joyce et al. | |
| 2002/0196342 A1 | 12/2002 | Walker et al. | |
| 2003/0003988 A1 | 1/2003 | Walker et al. | |
| 2003/0008707 A1 | 1/2003 | Walker et al. | |
| 2003/0027632 A1 | 2/2003 | Sines et al. | |
| 2003/0032485 A1 | 2/2003 | Cockerille et al. | |
| 2003/0045354 A1 | 3/2003 | Giobbi | |
| 2003/0054868 A1 | 3/2003 | Paulsen et al. | |
| 2003/0054881 A1 | 3/2003 | Hedrick et al. | |
| 2003/0064805 A1 | 4/2003 | Wells | |
| 2003/0074259 A1 | 4/2003 | Slyman et al. | |
| 2003/0083126 A1 | 5/2003 | Paulsen | |
| 2003/0083943 A1 | 5/2003 | Adams et al. | |
| 2003/0092477 A1 | 5/2003 | Luciano et al. | |
| 2003/0104865 A1 | 6/2003 | Itkis et al. | |
| 2003/0109250 A1 | 6/2003 | Pawlas | |
| 2003/0141359 A1 | 7/2003 | Dymovsky et al. | |
| 2003/0144052 A1 | 7/2003 | Walker et al. | |
| 2003/0148812 A1 | 8/2003 | Paulsen et al. | |
| 2003/0162591 A1 | 8/2003 | Nguyen et al. | |
| 2003/0172037 A1 | 9/2003 | Jung et al. | |
| 2003/0186739 A1 | 10/2003 | Paulsen et al. | |
| 2003/0199321 A1 | 10/2003 | Williams | |
| 2003/0203756 A1 | 10/2003 | Jackson | |
| 2003/0211889 A1 | 11/2003 | Walker | |
| 2003/0224852 A1 | 12/2003 | Walker et al. | |
| 2003/0228900 A1 | 12/2003 | Yamagishi | |
| 2004/0014514 A1 | 1/2004 | Yacenda | |
| 2004/0016797 A1 | 1/2004 | Jones et al. | |
| 2004/0023721 A1 | 2/2004 | Giobbi | |
| 2004/0039635 A1 | 2/2004 | Linde et al. | |
| 2004/0043814 A1 | 3/2004 | Angell et al. | |
| 2004/0085293 A1 | 5/2004 | Soper et al. | |
| 2004/0106454 A1 | 6/2004 | Walker et al. | |
| 2004/0127277 A1 | 7/2004 | Walker et al. | |
| 2004/0129773 A1 | 7/2004 | Lute et al. | |
| 2004/0147314 A1 | 7/2004 | Lemay et al. | |
| 2004/0185935 A1 | 9/2004 | Yamagishi | |
| 2004/0190042 A1 | 9/2004 | Ferlitsch et al. | |
| 2004/0192434 A1 | 9/2004 | Walker et al. | |
| 2004/0199284 A1 | 10/2004 | Hara | |
| 2004/0209690 A1 | 10/2004 | Bruzzese et al. | |
| 2004/0225565 A1 | 11/2004 | Selman | |
| 2004/0259640 A1 | 12/2004 | Gentles et al. | |
| 2004/0266395 A1 | 12/2004 | Pailles et al. | |
| 2005/0014554 A1 | 1/2005 | Walker et al. | |
| 2005/0020354 A1 | 1/2005 | Nguyen et al. | |
| 2005/0049049 A1 | 3/2005 | Griswold et al. | |
| 2005/0054438 A1* | 3/2005 | Rothschild | G07F 17/3239 463/29 |
| 2005/0059485 A1 | 3/2005 | Paulsen et al. | |
| 2005/0070257 A1 | 3/2005 | Saarinen et al. | |
| 2005/0076242 A1 | 4/2005 | Breuer | |
| 2005/0101383 A1 | 5/2005 | Wells | |
| 2005/0130728 A1 | 6/2005 | Nguyen et al. | |

(56) References Cited

U.S. PATENT DOCUMENTS

| | | |
|---|---|---|
| 2005/0215233 A1 | 9/2005 | Perera et al. |
| 2005/0227770 A1 | 10/2005 | Papulov |
| 2005/0240484 A1 | 10/2005 | Yan et al. |
| 2005/0255911 A1 | 11/2005 | Nguyen et al. |
| 2005/0287852 A1 | 12/2005 | Sugawara et al. |
| 2006/0018450 A1 | 1/2006 | Sandberg-Diment |
| 2006/0025206 A1 | 2/2006 | Walker et al. |
| 2006/0025222 A1* | 2/2006 | Sekine ............... G07F 17/32 463/42 |
| 2006/0035707 A1 | 2/2006 | Nguyen et al. |
| 2006/0040741 A1 | 2/2006 | Griswold et al. |
| 2006/0046823 A1 | 3/2006 | Kaminkow et al. |
| 2006/0046834 A1 | 3/2006 | Sekine |
| 2006/0046842 A1 | 3/2006 | Mattice et al. |
| 2006/0046849 A1 | 3/2006 | Kovacs |
| 2006/0046855 A1 | 3/2006 | Nguyen et al. |
| 2006/0049624 A1 | 3/2006 | Brosnan et al. |
| 2006/0079333 A1 | 4/2006 | Morrow et al. |
| 2006/0089174 A1 | 4/2006 | Twerdahl |
| 2006/0160617 A1 | 7/2006 | Hansen et al. |
| 2006/0160621 A1 | 7/2006 | Rowe et al. |
| 2006/0165060 A1 | 7/2006 | Dua |
| 2006/0166732 A1 | 7/2006 | Lechner et al. |
| 2006/0166741 A1 | 7/2006 | Boyd et al. |
| 2006/0173781 A1 | 8/2006 | Donner |
| 2006/0189382 A1* | 8/2006 | Muir ............... G07F 17/32 463/29 |
| 2006/0223627 A1 | 10/2006 | Nozaki et al. |
| 2006/0226598 A1 | 10/2006 | Walker et al. |
| 2006/0246981 A1 | 11/2006 | Walker et al. |
| 2006/0247037 A1 | 11/2006 | Park |
| 2006/0266598 A1 | 11/2006 | Baumgartner et al. |
| 2006/0271433 A1 | 11/2006 | Hughes |
| 2006/0279781 A1 | 12/2006 | Kaneko |
| 2006/0281554 A1 | 12/2006 | Gatto et al. |
| 2006/0287072 A1 | 12/2006 | Walker et al. |
| 2006/0287098 A1 | 12/2006 | Morrow et al. |
| 2007/0017979 A1 | 1/2007 | Wu et al. |
| 2007/0021198 A1* | 1/2007 | Muir ............... G07F 17/3262 463/29 |
| 2007/0060302 A1 | 3/2007 | Fabbri |
| 2007/0060372 A1 | 3/2007 | Yamagishi et al. |
| 2007/0117608 A1 | 5/2007 | Roper et al. |
| 2007/0117623 A1 | 5/2007 | Nelson et al. |
| 2007/0129150 A1 | 6/2007 | Crowder et al. |
| 2007/0129151 A1 | 6/2007 | Crowder et al. |
| 2007/0155469 A1 | 7/2007 | Johnson |
| 2007/0159301 A1 | 7/2007 | Hirt et al. |
| 2007/0159994 A1 | 7/2007 | Brown et al. |
| 2007/0174809 A1 | 7/2007 | Brown et al. |
| 2007/0190494 A1 | 8/2007 | Rosenberg |
| 2007/0202941 A1 | 8/2007 | Miltenberger et al. |
| 2007/0218971 A1 | 9/2007 | Berube |
| 2007/0218985 A1 | 9/2007 | Okada |
| 2007/0218989 A1 | 9/2007 | Okada |
| 2007/0218990 A1 | 9/2007 | Okada |
| 2007/0218991 A1 | 9/2007 | Okada |
| 2007/0238505 A1 | 10/2007 | Okada |
| 2008/0026816 A1 | 1/2008 | Sammon et al. |
| 2008/0026823 A1 | 1/2008 | Wolf et al. |
| 2008/0026844 A1 | 1/2008 | Wells |
| 2008/0028235 A1* | 1/2008 | Smith ............... G06F 21/575 713/190 |
| 2008/0070671 A1 | 3/2008 | Okada |
| 2008/0076528 A1 | 3/2008 | Nguyen et al. |
| 2008/0076572 A1 | 3/2008 | Nguyen et al. |
| 2008/0085753 A1 | 4/2008 | Okada |
| 2008/0113791 A1 | 5/2008 | Williams |
| 2008/0123026 A1 | 5/2008 | Kwag et al. |
| 2008/0139306 A1 | 6/2008 | Lutnick et al. |
| 2008/0150678 A1 | 6/2008 | Giobbi et al. |
| 2008/0166997 A1 | 7/2008 | Sun et al. |
| 2008/0168542 A1 | 7/2008 | Sato |
| 2008/0182644 A1 | 7/2008 | Lutnick et al. |
| 2008/0200251 A1 | 8/2008 | Alderucci et al. |
| 2008/0207296 A1 | 8/2008 | Lutnick et al. |
| 2008/0213026 A1 | 9/2008 | Grabiec et al. |
| 2008/0234028 A1 | 9/2008 | Meyer et al. |
| 2008/0261682 A1 | 10/2008 | Phillips et al. |
| 2008/0268934 A1 | 10/2008 | Mattice et al. |
| 2008/0270302 A1 | 10/2008 | Beenau et al. |
| 2008/0293483 A1 | 11/2008 | Pickus et al. |
| 2008/0300061 A1 | 12/2008 | Zheng |
| 2008/0305860 A1 | 12/2008 | Linner |
| 2008/0305862 A1 | 12/2008 | Walker et al. |
| 2008/0305873 A1 | 12/2008 | Zheng |
| 2008/0311971 A1 | 12/2008 | Dean |
| 2008/0318655 A1 | 12/2008 | Davies |
| 2009/0011821 A1 | 1/2009 | Griswold et al. |
| 2009/0023490 A1 | 1/2009 | Moshal et al. |
| 2009/0054149 A1 | 2/2009 | Brosnan et al. |
| 2009/0098943 A1 | 4/2009 | Weber et al. |
| 2009/0108057 A1 | 4/2009 | Mu |
| 2009/0124350 A1 | 5/2009 | Iddings et al. |
| 2009/0124376 A1 | 5/2009 | Kelly et al. |
| 2009/0125429 A1 | 5/2009 | Takayama |
| 2009/0131134 A1 | 5/2009 | Baerlocher et al. |
| 2009/0176505 A1* | 7/2009 | Van Deventer ....... G06F 1/1626 455/456.1 |
| 2009/0183243 A1 | 7/2009 | Ruppert et al. |
| 2009/0186680 A1 | 7/2009 | Napolitano et al. |
| 2009/0197684 A1 | 8/2009 | Arezina et al. |
| 2009/0227317 A1 | 9/2009 | Spangler |
| 2009/0233715 A1 | 9/2009 | Ergen et al. |
| 2009/0275397 A1 | 11/2009 | Van et al. |
| 2010/0012715 A1 | 1/2010 | Williams et al. |
| 2010/0016075 A1 | 1/2010 | Thomas |
| 2010/0048297 A1 | 2/2010 | Dasgupta |
| 2010/0062840 A1 | 3/2010 | Herrmann |
| 2010/0069160 A1 | 3/2010 | Barrett et al. |
| 2010/0087241 A1 | 4/2010 | Nguyen et al. |
| 2010/0087249 A1 | 4/2010 | Rowe |
| 2010/0093421 A1 | 4/2010 | Nyman et al. |
| 2010/0093429 A1 | 4/2010 | Mattice et al. |
| 2010/0105357 A1 | 4/2010 | Tsai |
| 2010/0113061 A1 | 5/2010 | Holcman |
| 2010/0113161 A1 | 5/2010 | Walker et al. |
| 2010/0173691 A1 | 7/2010 | Wolfe |
| 2010/0174650 A1 | 7/2010 | Nonaka |
| 2010/0178986 A1 | 7/2010 | Davis et al. |
| 2010/0219234 A1 | 9/2010 | Forbes |
| 2010/0227670 A1 | 9/2010 | Arezina et al. |
| 2010/0234099 A1 | 9/2010 | Rasmussen et al. |
| 2010/0250787 A1 | 9/2010 | Miyata |
| 2010/0304848 A1 | 12/2010 | Detlefsen et al. |
| 2010/0323785 A1 | 12/2010 | Motyl et al. |
| 2010/0323789 A1 | 12/2010 | Gabriele et al. |
| 2010/0331079 A1 | 12/2010 | Bytnar et al. |
| 2011/0015976 A1 | 1/2011 | Lempel et al. |
| 2011/0028199 A1 | 2/2011 | White et al. |
| 2011/0065496 A1 | 3/2011 | Gagner et al. |
| 2011/0065497 A1 | 3/2011 | Patterson |
| 2011/0076963 A1 | 3/2011 | Hatano |
| 2011/0086691 A1 | 4/2011 | Luciano et al. |
| 2011/0086696 A1 | 4/2011 | Macewan |
| 2011/0098104 A1 | 4/2011 | Meyerhofer |
| 2011/0111840 A1* | 5/2011 | Gagner ............... G07F 17/34 463/25 |
| 2011/0118008 A1 | 5/2011 | Taylor |
| 2011/0119098 A1 | 5/2011 | Miller et al. |
| 2011/0136576 A1 | 6/2011 | Kammler et al. |
| 2011/0137765 A1* | 6/2011 | Nonaka ............... G07F 9/001 705/30 |
| 2011/0207531 A1 | 8/2011 | Gagner et al. |
| 2011/0208418 A1 | 8/2011 | Looney et al. |
| 2011/0219427 A1* | 9/2011 | Hito ............... H04L 63/0853 726/3 |
| 2011/0242565 A1 | 10/2011 | Armstrong |
| 2011/0287823 A1 | 11/2011 | Guinn et al. |
| 2011/0295668 A1 | 12/2011 | Charania et al. |
| 2011/0306400 A1 | 12/2011 | Nguyen |
| 2011/0306401 A1 | 12/2011 | Nguyen |
| 2011/0314153 A1 | 12/2011 | Bathiche et al. |
| 2012/0015735 A1 | 1/2012 | Abouchar et al. |

(56) References Cited

U.S. PATENT DOCUMENTS

| | | |
|---|---|---|
| 2012/0042363 A1 | 2/2012 | Moosavi |
| 2012/0046110 A1 | 2/2012 | Amaitis et al. |
| 2012/0066048 A1 | 3/2012 | Foust et al. |
| 2012/0072111 A1 | 3/2012 | Davis et al. |
| 2012/0084131 A1 | 4/2012 | Bergel et al. |
| 2012/0094757 A1 | 4/2012 | Vago et al. |
| 2012/0122584 A1 | 5/2012 | Nguyen |
| 2012/0122585 A1 | 5/2012 | Nguyen |
| 2012/0129586 A1 | 5/2012 | Lutnick et al. |
| 2012/0129611 A1 | 5/2012 | Rasmussen et al. |
| 2012/0131331 A1* | 5/2012 | Benson .................. H04L 9/3228 713/155 |
| 2012/0143759 A1 | 6/2012 | Ritorto, Jr. |
| 2012/0149561 A1 | 6/2012 | Ribi et al. |
| 2012/0158922 A1 | 6/2012 | Aggarwal |
| 2012/0160912 A1 | 6/2012 | Laracey |
| 2012/0187187 A1* | 7/2012 | Duff ...................... G06Q 10/00 235/382 |
| 2012/0190455 A1 | 7/2012 | Briggs |
| 2012/0198531 A1* | 8/2012 | Ort ........................ H04W 12/06 709/227 |
| 2012/0221474 A1 | 8/2012 | Eicher et al. |
| 2012/0242868 A1 | 9/2012 | Anzai |
| 2012/0252556 A1 | 10/2012 | Doyle et al. |
| 2012/0276990 A1 | 11/2012 | Arezina et al. |
| 2012/0290336 A1 | 11/2012 | Rosenblatt et al. |
| 2012/0295541 A1 | 11/2012 | Kwon |
| 2012/0300753 A1 | 11/2012 | Brown et al. |
| 2012/0324076 A1 | 12/2012 | Zerr |
| 2012/0324135 A1 | 12/2012 | Goodman et al. |
| 2013/0013389 A1 | 1/2013 | Vitti et al. |
| 2013/0016710 A1 | 1/2013 | Shinohara |
| 2013/0017884 A1 | 1/2013 | Price et al. |
| 2013/0023339 A1 | 1/2013 | Davis et al. |
| 2013/0031260 A1 | 1/2013 | Jones |
| 2013/0053133 A1 | 2/2013 | Schueller |
| 2013/0053136 A1 | 2/2013 | Lemay et al. |
| 2013/0053148 A1 | 2/2013 | Nelson et al. |
| 2013/0065666 A1 | 3/2013 | Schueller et al. |
| 2013/0065668 A1 | 3/2013 | Lemay et al. |
| 2013/0065678 A1 | 3/2013 | Nelson et al. |
| 2013/0065686 A1 | 3/2013 | Lemay et al. |
| 2013/0111208 A1 | 5/2013 | Sabin et al. |
| 2013/0130777 A1 | 5/2013 | Lemay et al. |
| 2013/0130778 A1 | 5/2013 | Anderson et al. |
| 2013/0130785 A1 | 5/2013 | Small |
| 2013/0137509 A1 | 5/2013 | Weber |
| 2013/0137510 A1 | 5/2013 | Weber |
| 2013/0137516 A1 | 5/2013 | Griswold et al. |
| 2013/0165199 A1 | 6/2013 | Lemay et al. |
| 2013/0165208 A1 | 6/2013 | Nelson et al. |
| 2013/0165209 A1 | 6/2013 | Lemay et al. |
| 2013/0165210 A1 | 6/2013 | Nelson et al. |
| 2013/0165232 A1 | 6/2013 | Nelson et al. |
| 2013/0196755 A1 | 8/2013 | Nelson et al. |
| 2013/0225279 A1 | 8/2013 | Patceg et al. |
| 2013/0244772 A1 | 9/2013 | Weber |
| 2013/0252713 A1 | 9/2013 | Nelson et al. |
| 2013/0260889 A1 | 10/2013 | Lemay et al. |
| 2013/0316808 A1 | 11/2013 | Nelson et al. |
| 2013/0324237 A1 | 12/2013 | Adiraju et al. |
| 2013/0337890 A1 | 12/2013 | Earley et al. |
| 2013/0344942 A1 | 12/2013 | Price et al. |
| 2014/0045586 A1 | 2/2014 | Allen et al. |
| 2014/0141864 A1 | 5/2014 | Ward et al. |
| 2014/0162768 A1 | 6/2014 | Nelson et al. |
| 2014/0197232 A1* | 7/2014 | Birkler ................... H04L 63/08 235/375 |
| 2014/0197234 A1 | 7/2014 | Hammad |
| 2014/0200065 A1 | 7/2014 | Anderson et al. |
| 2014/0221099 A1 | 8/2014 | Johnson et al. |
| 2014/0248941 A1 | 9/2014 | Nelson et al. |
| 2014/0342820 A1 | 11/2014 | Nelson et al. |
| 2014/0357353 A1 | 12/2014 | Popovich et al. |
| 2014/0370971 A1 | 12/2014 | Kelly et al. |
| 2015/0072774 A1 | 3/2015 | Anderson et al. |
| 2016/0163153 A1 | 6/2016 | Earley et al. |
| 2016/0225223 A1 | 8/2016 | LeMay |
| 2017/0011590 A1 | 1/2017 | Nelson |
| 2018/0286178 A1 | 10/2018 | Nelson |

FOREIGN PATENT DOCUMENTS

| | | |
|---|---|---|
| EP | 1857987 A2 | 11/2007 |
| EP | 1858280 A2 | 11/2007 |
| WO | 2002091118 A2 | 11/2002 |
| WO | 03027970 A2 | 4/2003 |
| WO | 2007075380 A2 | 7/2007 |
| WO | 2010048591 A1 | 4/2010 |
| WO | 2010056729 A1 | 5/2010 |
| WO | 2010115063 A1 | 10/2010 |
| WO | 2012112602 A1 | 8/2012 |
| WO | 2013128296 A1 | 9/2013 |

OTHER PUBLICATIONS

F. Bersani et al.: "The EAP-PSK Protocol: A Pre-Shared Key Extensible Authentication Protocol (EAP) Method"; The Network Group; Siemens Networks GmbH & Co. KG: Jan. 2007; 64 pages.
Order Granting Reequest for Ex Parte Reexamination for U.S. Appl. No. 90/015,118, dated Nov. 17, 2022 (25 pages).
Non-Final Office Action for Reexam Application No. 90/015,118, dated Jun. 28, 2024.

\* cited by examiner

METHODS AND APPARATUS FOR PROVIDING SECURE LOGON TO A GAMING MACHINE USING A MOBILE DEVICE

PRIORITY CLAIM

This application is a continuation of, claims the benefit of and priority to U.S. patent application Ser. No. 18/380,989, filed on Oct. 17, 2023, which is a continuation of, claims the benefit of and priority to U.S. patent application Ser. No. 17/487,529, filed on Sep. 28, 2021, which is a continuation of, claims the benefit of and priority to U.S. patent application Ser. No. 16/456,696, filed on Jun. 28, 2019, which is a continuation of, claims the benefit of and priority to U.S. patent application Ser. No. 16/000,240, filed on Jun. 5, 2018, now U.S. Pat. No. 10,706,677, which is a continuation of, claims the benefit of and priority to U.S. patent application Ser. No. 15/270,828, filed on Sep. 20, 2016, now U.S. Pat. No. 10,013,850, which is a continuation of, claims the benefit of and priority to U.S. patent application Ser. No. 14/875,469, filed on Oct. 5, 2015, now U.S. Pat. No. 9,852,578, which is a continuation of, claims the benefit of and priority to U.S. patent application Ser. No. 14/181,372, filed on Feb. 14, 2014, now U.S. Pat. No. 9,875,607, which is a continuation-in-part of, claims the benefit of and priority to U.S. patent application Ser. No. 13/181,725, filed on Jul. 13, 2011 and which is a continuation-in-part of, claims the benefit of and priority to U.S. patent application Ser. No. 13/478,551, filed on May 23, 2012, the entire contents of which are each incorporated by reference herein.

BACKGROUND

Developing and maintaining a loyal customer base is a critical component of operating a successful casino enterprise. To develop a loyal customer base, casino enterprises attempt to generate interactions with their patrons that provide a unique and personalized game playing experience. As an example, casino enterprises offer patrons the opportunity to participate in a loyalty program. Via the loyalty program, patrons are offered various promotions and free items that encourage the patron to return to the casino.

In the loyalty program, the promotions can be tailored to the patron's preferences. As an example, if preferred, a patron can choose to receive promotional credits for game play on an electronic gaming machine and information regarding this preference can be stored to an account associated with the loyalty program. In general, information regarding the patron's preferences in regards to promotions as well as other activities within the casino enterprise, such as food, drink and room preferences, can be stored to their account associated with the loyalty program. The patron information stored in the account can be used to personalize the service and the game playing experience provided by the casino enterprise.

An ever increasing portion of patrons that visit casinos are regularly carrying portable electronic devices, such as smart phones, laptops, netbooks and tablet computers, on their person. The portable electronic devices provide 1) a means of communication allowing the patron to communicate with other individuals within or outside of a casino via a number of different communication modes, 2) a source of news and information, 3) a portal to the patron's on-line activities, such as social media applications, 4) support for entertainment features, such as audio/video playback and gaming applications, 5) a repository for personal information, such as financial information that enables financial transactions in a mobile wallet applications and 6) a means of capturing information, such as video images and audio recordings. Thus, portable electronic devices, such as smart phones, are becoming essential tools and in some instances, the primary electronic interface for many individuals.

The popularity of portable electronic devices allows for the possibility of utilizing their capabilities to further personalize and enhance the gaming experience in a casino gaming environment. In view of the above, methods and apparatus are desired that allow for complementary interactions with a portable electronic devices within a casino environment, such as when a patron is participating in game play on an electronic gaming machine.

BRIEF SUMMARY

A gaming system compatible with patron-controlled portable electronic devices, such as smart phones, portable entertainment electronics, netbooks, laptops, and tablet computers, is described. The gaming system can include a server coupled to a number of different electronic wager-based gaming machines. The EGMs can be located within a single gaming establishment, such as a casino, or the EGMs can be distributed across multiple gaming establishments within a gaming enterprise.

In one specific embodiment, the EGM is configured to receive an initiation of a transaction on the EGM that requires the input of Sensitive Information (SI) for continuance of the transaction, and establish communications with a PED. The EGM is further configured to receive SI data input from the PED, and validate the received input SI data in order to further said continuance of the transaction.

In another embodiment, the EGM is configured to include a wireless interface for direct communications with the PED and established communications are via the wireless interface. The communications are performed with a secure pairing with the PED.

In particular configurations, the communications with the PED are via a remote server in communication with the PED. For instance, the remote server can function as a communication intermediary between an EGM and a PED. In addition, the server can be configured to perform operations that allow SI data to be input and entered from a PED. The server can be located on a casino area network which is internal to the casino, which in turn, casino area network can be isolated from external networks such as the Internet.

In another embodiment, the validation of the input SI data includes comparing the input SI data with stored SI data in either of the EGM and the remote server. In the event that the input SI data is determined valid, the EGM is configured to communicate with the PED informing of the validation of input SI data, and in the event that the input SI data is determined invalid, communicate with the PED informing of the invalidation of the input SI data.

In one particular embodiment, the input SI data may include a wager, a PIN, a password, an account number, biometric input, game play input, social security, a name, a phone number, and an address. The selected transaction requiring the input SI data may include an account login, a player tracking transaction, a cash-out, game play, a cash transfer transaction, a player club operations transaction or an enrollment transaction for a promotion.

In another aspect of the present invention, a computer readable medium is provided for executing computer code on a processor in a wager-based electronic gaming machine that includes computer code for receiving an initiation of a transaction on the EGM that requires the input of Sensitive Information (SI) for continuance of the transaction, and computer code for establishing communications with a PED. The computer readable medium further includes computer code for receiving the input SI data input from the PED; and computer code for validating the input SI data in order to further said continuance of the transaction.

Yet another aspect of the present invention includes a casino server, having a processor and a memory configured to communicate with a plurality of wager-based electronic gaming machines (EGMs), configured to receive an initiation of a transaction from an EGM that requires the input of Sensitive Information (SI) for continuance of the transaction, and to establish communications with a PED. The casino server is further configured to receive input SI data input from the PED, and to validate the input SI data in order to further said continuance of the transaction on the server.

BRIEF DESCRIPTION OF THE SEVERAL VIEWS OF THE DRAWINGS

The embodiments will be readily understood by the following detailed description in conjunction with the accompanying drawings, wherein like reference numerals designate like structural elements, and in which.

DETAILED DESCRIPTION

Figure 1:
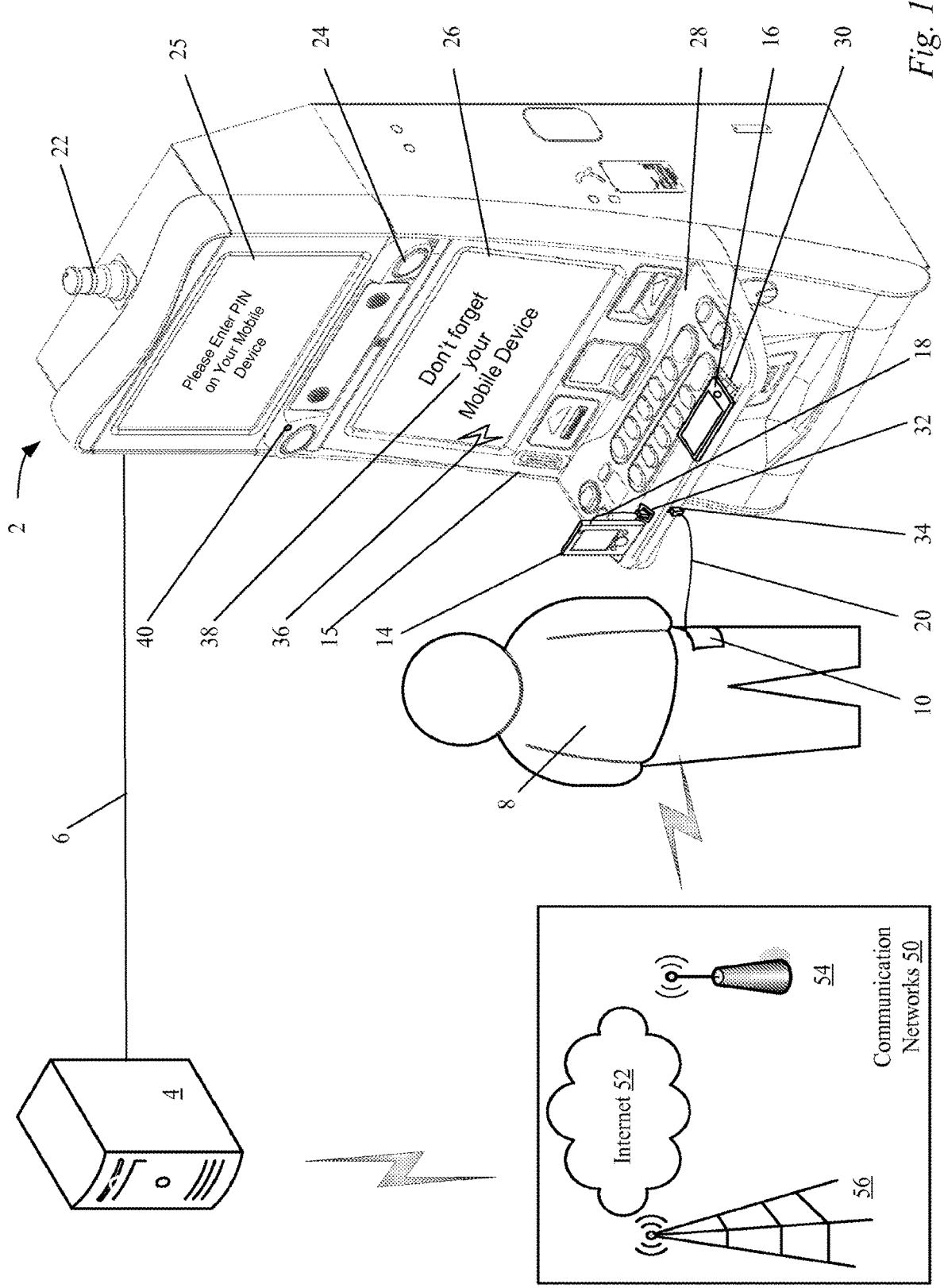
FIG. 1 shows a block diagram of a gaming system including EGMs, a server and portable electronic devices in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A gaming system compatible with mobile or portable electronic devices controlled by users of the gaming system is described. The gaming system can include a number of features that encourage and enable the use of mobile or portable electronic devices, such as cell phones, smart phones, portable entertainment electronics, netbooks, tablets or laptop computers, in a casino gaming environment. By way of example, for applications requiring secure transactions, the player is currently required to enter their PIN, account, name, address, social security, phone number, etc. or other personal authorization of identification information (i.e., Sensitive Information (SI)) on the EGM screen in order to continue their transaction. In another example, communal games may require the input of their wager or their playing strategies. Such transactions, for instance, include access to the play of communal games, player tracking, accounting, cash-outs, mobile money transfers, general account settings or password or pass code recovery, etc.

Since the EGMs are often oriented adjacent and/or very close to one another, some players/patrons are hesitant about entering their personal or sensitive information directly into the EGM where others can easily view the EGM screen and/or observe their key input of their Authorization or Personal Information. In communual games, in another example, a Player/Patron may not desire others to observe their wager, their playing strategies, and especially their cards on the EGM screen. They also may not desire others to observe their credit balance which itself constitutes Sensitive Information. Some players, thus, may be reluctant to enter such information in this manner, and ultimately elect to not participate in the games offered at all.

According to the present invention, therefore, when a transaction on an EGM is initiated that requires the input of Sensitive Information (SI), such SI can be input directly into the keypad (or keyboard) of their own personal Portable Electronic Device (PED) once that device is in secure communication with the EGM or system server. Hence, the entered SI may only be viewed on the significantly smaller display of the portable electronic device where the player can easily shield the keypad and/or display from the view of others. Once the SI is entered into their portable electronic device, such information is then transmitted to the EGM or server where, once validated, enables the patron to continue their secure transaction or game.

Details of embodiments involving the method and apparatus for entering sensitive data (e.g., Sensitive Information) for an Electronic Gaming Machine from a portable electronic device are described with respect to the following figures. Device interactions within a gaming system including EGM-portable electronic device communications are discussed with respect to FIG. 1 where the input of sensitive and personal SI can be input directly on the portable electronic device, and transmitted directly to the EGM and/or system server. With respect to FIGS. 2A-2D, a portable electronic device screen is shown illustrating an example sequence of the input of SI from the portable device. In FIG. 3A, a flowchart is provided showing a method in the EGM related to the input of personal SI direct from the portable electronic device for use in the EGM transaction is described. FIG. 3B, on the other hand, shows a method in a system server related to the input of personal SI direct from the portable electronic device for use in an EGM transaction is described. Finally, with respect to FIGS. 4 and 5, additional details of gaming devices including an EGM and the gaming system are described.

EGM-Portable Electronic Device Interfaces

In this section, some examples of interfaces on an EGM that enable portable electronic device interactions are described. FIG. 1 shows an EGM 2 with interfaces for interacting with a portable electronic device. The EGM 2 can be part of a gaming system that includes a number of gaming devices and servers, such as sever 4. The communication connection 6 between the EGM 2 and the server 4 can be wired, wireless or a combination of wired and wireless communication links depending on the local and/or wide area network topology used within the gaming system.

The EGM 2 can include a) displays, such as a main display 26 on which a wager-based game can be output, b) audio devices, such as speaker 24 for outputting sounds from the EGM and c) a player input panel 28 including buttons for making inputs associated with the play of the wager-based game, as well as the input of Sensitive Information (SI). These devices can be controlled by a game controller (not shown) located within the cabinet of the EGM 2. Further details of the EGM's game controller and other gaming related methods that can be utilized within the gaming system are described with respect to FIGS. 4 and 5.

The EGM 2 can include a number of different types of interfaces that enable interactions with a mobile or portable electronic device, such as a cell phone, a smart phone, a laptop or a tablet computer. One type of interface is a power interface. Another type of interface, described in more detail below is a communication interface which is the interface utilized in the present invention. Via a power interface, power can be supplied to the portable electronic device. For instance, power interfaces 32 and 34 can be configured to receive a connector that allows an electronic device to be electrically coupled to the EGM 2. In one embodiment, the power interface 32 and 34 can be configured to accept a USB connector and thus, can be compatible with USB connector power requirements. Other types of power interfaces, such as a standard 120V receptacle can be provided.

In general, one or more power interfaces can be provided. When two or more power interfaces are provided the interfaces can employ the same or different power configurations. For instance, when two interfaces are provided, both can be configured to accept a USB connector or a first can be configured to be compatible with a USB connector while a second can be compatible with a two pronged connector. Thus, the voltage and current supplied by each power interface can vary from interface to interface depending on the power standard for which the power interface is configured. The one or more power interfaces can be located on different surfaces of the EGM 2. For instance, power interface 32 is located on an upper surface of the player input panel 28 and power interface 34 is located on a front surface of the player input panel 28. In other examples, the power interfaces can be located on a different surface, such as a front surface of the EGM cabinet.

A connector 18 is shown leading from power interface 32 to portable electronic device (PED) 14 positioned on the player input panel 28 and a connector 20 is shown leading from power interface 20 to a portable device (not shown) located in the pocket 10 of user 8. At the device end, the connector, such as 18 or 20, can include a power interface compatible with the portable device, such as device 14 or the device located in the pocket of user 8. At the EGM end, the connector, such as 18 or 20, can include a power interface compatible with the EGM power interface. The interfaces at each end of the connector can be coupled via a cord. Typically, the interface between a connector (e.g., 18 or 20) and a portable device varies widely from model to model and from manufacturer to manufacturer where the interface at the device end can transmit communications and/or power to the portable device. Thus, in one embodiment, the connector, such as 18 and 20, can be provided by the user, such as 8.

In yet another embodiment, an interface 30 for wireless power transmission can be provided on the EGM 2. As an example, player input panel 28 includes a wireless power interface 30, such as a Powermat™ (Powermat Inc, Commerce Charter Township, Michigan). The wireless power interface can be compatible with a number of different types of devices. A portable device 16 is shown resting on the wireless power interface in a position that allows it to receive power via the wireless power interface 30. Power to the wireless power interface can be switched on and off depending on the machine status.

In particular embodiments, the interfaces 30, 32 and 34 can include sealing mechanisms that are configured to protect the interface in the case of spill, such as a user spilling a drink on the interface. Further, the interfaces can be configured to protect against electrostatic discharge (ESD). The ESD protection can include isolation circuits, filtering circuits, and suppression components, such as multilayer varistors, silicon diodes, and polymer-based suppressors. Suppression components protect the circuit by clamping the ESD voltage to a level that the circuit can survive. Connected in parallel with the signal lines, the suppressors clamp the ESD voltage and shunt the majority of the ESD current away from the data line, and the protected chip, to the appropriate reference. Typical references are the power rail and chassis ground.

In alternate embodiments, one or more of the interfaces 30, 32 and 34, can be configured as power and data interfaces or as a data only interface. For instance, via interface 32 and connector 18, power and data can be transmitted from the EGM 2 to the portable electronic device (PED) 14 or only data can be transmitted between the EGM 2 and the PED 14. In one embodiment, for security purposes, when a data interface is provided, the communications can be unidirectional such that only data can be sent from the EGM 2 to the portable device via the data interface. In other embodiments, the return communications that can be sent from the device to the EGM 2 and recognized by the game controller can be very limited for security purposes. The format of the return communications can be described by a communication protocol (and/or implemented with an application program interface).

The EGM 2 can support one or more wireless communication interfaces for communicating with a PED, such as 14 or 16. For instance, a first communication wireless interface can support Bluetooth™ communications, a second wireless communication interface can support communications via Wi-Fi™ (compatible with IEEE 802.11 standards) and a third wireless communication interface can support a NFC communication protocol (see FIG. 4 for more detail). In one embodiment, a wireless communication interface can be integrated or located proximate to the wireless power interface. For example, a wireless communication interface supporting an NFC communication protocol can be integrated with the wireless power interface 30. Thus, when the device 16 is placed near the wireless communication interface 30, NFC formatted communication can occur between the device 16 and the EGM 2. In other embodiments, the wireless communication interfaces can be placed in other locations within the EGM 2. Thus, the placement near the wireless power interface is discussed for the purposes of illustration only.

In one embodiment, the NFC communication can be used to exchange information to allow a secure pairing to be established between a user-controlled device and the EGM 2. For instance, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol allows for a Wi-Fi device pair directly with another without having to first join a local network. The method makes it possible to share media from a phone, play multiplayer games or otherwise communicate directly, even when no router exists. Via pairing between the EGM 2 and portable electronic device, a portable electronic device may be able to utilize some of the functionality of secondary devices residing on the EGM 2. For instance, it may be possible for a player to print something from their portable electronic device using the printer on the EGM 2 when it is paired to the EGM 2.

The EGM 2 can include one or more support structures configured to receive a portable electronic device. The support structures can be integrated into the EGM cabinet such that a device placed in the support structure isn't easily knocked out of the support structure and placement of the device doesn't block access to input buttons on the EGM 2 during game play. The support structure can be configured to support a device various positions, such as upright, on its side or on its back. Further, the support structures can be configured to allow a device received in the support structure to be positioned in a preferred orientation. For instance, device 14 is placed in a support structure with a receptacle built into the player input panel 28 that allows the device to be orientated in an upright position. As another example, device 16 is placed flat on a ledge of the player input panel 28. The ledge can include an indentation or a high-friction material (anti-slip) that is designed to keep the device 16 from sliding off of the ledge. Support structures can be placed in other locations on the EGM cabinet and these examples are provided for the purposes of illustration only.

The support structure can include a stand or bracket for supporting the device. In one embodiment, the support structure can include a switch that is activated by a weight of the portable electronic device. The switch may be used for device detection purposes. The support structure can be sealed to provide protection in the event of spills. Further, it can include other tamper-resistant features, such as features that prevent the internal elements of the EGM 2 from being exposed. In one embodiment, a NFC interface can be located proximate to the support structure, such that it can be utilized when a device is placed in the support structure.

In alternate embodiments, the support structure, data interfaces and power interfaces can be incorporated into a secondary device utilized on the EGM 2. For instance, one or more of a support structure, a power interface or a wireless interface can be incorporated into a player tracking unit with a smart interface board (SMIB), a card reader, a bill validator or a printer. Further, all or a portion of the control of the power interfaces and/or wireless interface in the manner described herein can be performed by a secondary processor on the secondary device in conjunction with or independently of the game controller on the EGM 2. In another embodiment, all or a portion of the control of the power interfaces and/or wireless can be implemented in a "service window" type architecture (see FIG. 4 for more details).

In particular embodiments, the EGM 2 can be configured to provide indicators of a status of a power and/or data interface. For instance, in one embodiment, when a power and/or data interface is active, an icon indicating a status of the interface can be displayed on the EGM 2. For example, a lightning bolt 36 is shown on display 26 to indicate that power is actively being supplied to one of the power interfaces. Similarly, another icon can be displayed to represent an active communication session via a communication interface, such as a communication interface involving a wired or wireless connection between the EGM 2 and a PED.

In other embodiments, an interface, such as 30, 32 and 34, can be surrounded by lighted bezel, partially surrounded by a lighted bezel or include an indicator light near the interface. The lighted bezel can be configured to change color, emit a particular lighting pattern or combinations, such as flashing or steady, to indicate that the power interface is delivering power. For instance, a bezel or indicator can be lighted with a green color when power is being delivered to the interface and a red color when power is cut-off to the interface. In another example, a status light can be turned on when power is being delivered via the interface and turned off when power is not being supplied. Similar, status indicators can be used for communication interfaces to indicate an active or non-active communication session. For instance, the lighted bezel and/or audio feedback can be used to indicate proper device pairing, secure communications and/or recognition and successful establishment of communications.

Other types of feedback mechanisms can be utilized to indicate a status of an interface. For instance, audio devices can be used to provide audio feedback and/or vibration generating devices, which can also produce an audible buzz, can be used to provide feedback. These feedback mechanisms can be used alone or in combination with other feedback mechanisms, such as a light generating mechanism, to indicate the status of various processes implemented on the EGM 2.

In particular embodiments, the EGM 2 can be configured to detect the presence of a PED and/or user and encourage the user to retrieve their PED at the end of a game play session. For instance, the EGM 2 can include a camera, such as 40, with a field of view including the player input panel 28. Using image recognition software, the game controller can be configured to recognize an object, such as but not limited to a PED, left on the input panel 28. Image data received from a camera may also be used to recognize the presence of a user at the EGM 2 and possibly for eye tracking purposes. In one embodiment, a camera can be placed with a field of view of base of the EGM 2, such as the floor area beneath input panel 28. Image data from this camera can be used to recognize objects left on the floor of the EGM 2 near its base, such as a portable electronic or wallet that has fell onto the floor or a purse/bag left at the EGM 2. As described above, the presence of a PED can also be determined via signal strength and/or triangulation.

When a PED is detected near the EGM 2, the game controller can be configured, after certain game events, to notify a player to retrieve and/or disconnect their device from the EGM 2. For instance, after a cashout command is received by the game controller, the gaming controller can be configured to display a message 38, such as "Don't forget your Mobile Device." As another example, the EGM 2 can be configured to emit a sound effect, such as a beeping to get the user's attention in regards to retrieving a device. In yet another example, the EGM 2 configured to flash lights in a distinctive pattern to get the user's attention.

EGM-Portable Electronic Device-User Interactions

Next with respect to FIG. 1, user interactions with EGM 2 that can lead to a communication connection between the EGM 2 and PEDs, such as 14 and 16, are described. Further, connection schemes that can be utilized between the PED and the EGM 2 are described. A user 8 with a PED, such as 14 and 16, can approach EGM 2 to play a wager-based game. The EGM 2 includes an upper video display 25 and lower video display 26 disposed in a secure cabinet 5 with locking mechanisms. The lower video display 26 can be used to display video images associated with the play of a wager-based game, such as a game outcome presentation. The upper video display 25 can be used to display attract features and a bonus game outcome presentation that is triggered from the play of the wager-based game on the lower video display 26. One or both of the upper video display 25 and lower video display 26 can include touch screens. In one embodiment, a portion of the video display screens can be allocated for control a remote device, such as server 4. This embodiment can be referred to as a service window and is described in more detail below with respect to FIG. 4.

To start game play, credits are first deposited on the EGM 2 that can be used for wagers. For instance, currency or a ticket voucher redeemable for credits can be inserted in bill acceptor 35. The ticket voucher can be validated by a remote server in the gaming system, such as 4. As another example, information can be transferred from the PEDs, 14 or 16, to the EGM 2. The EGM 2 can include wireless and/or wired interfaces that enable communications between the EGM 2 and the PEDs to be established.

The PEDs, such as 14 or 16, can be configured as an electronic wallet and the information transfer can be used to initiate an electronic funds transfer that results in credits being deposited on the EGM 2. The use of the PED in for these transactions can alert the EGM 2 to the presence of the PED. In response to the use of PEDs for these purposes, the EGM 2 may attempt to initiate communications with the PED that allow it to use the PED's wide area network access capabilities.

Whether credits are deposited via a tangible medium, such as a ticket voucher or paper currency, or electronically, such as via the PED, the user is likely to be near the front of the EGM 2. Thus, if they are carrying a PED, it is likely to be in the general area of the EGM 2. For example, the PED is likely to be at least an arm's length distance from the EGM 2. Thus, the EGM 2 can establish a connection with the PED 14 or 16 that can be used to facilitate a connection with a remote device via wide area networking capabilities provided by the PED 14 or 16.

After depositing credits, a player can make a wager and initiate a game on the EGM 2. The input panel 28 can be used to make selections related to the play of the game, such as a wager amount, and initiate the game. After the game is initiated, a game outcome presentation can be generated on EGM 2. It can include video images output to the displays and accompanying sound effects. For example, during a video slot game played on EGM 2, the game controller can generate a game presentation including a series of video images that show at different times an amount wagered on the game, symbols moving and then stopping in a final position and an award amount associated with game based upon the amount wagered and the final position of the symbols.

In some instances, after depositing credits, typically before beginning game play, a player can initiate a player tracking session on the EGM 2. During a player tracking session, information associated with game play, such as amounts wagered and amounts won can be stored to a player tracking account. This information is often referred to as player tracking information. To encourage repeat business, gaming enterprises often provide complimentary awards ("comps"), such as free meals and lodging, to players. The value of the comp can depend on the value of the player to the casino based upon their player tracking information, such as amounts wagered over time.

The player tracking account can be associated with the user that has initiated game play on EGM 2 and can be hosted on a remote device, such as server. The player can initiate a player tracking session by providing player tracking account information that allows their player tracking account to be located on a device that hosts player tracking accounts. In one embodiment, the player tracking account information can be stored on the PEDs, 14 or 16, and transmitted to the EGM via a compatible communication interface. In another embodiment, the player tracking account information can be stored on a card that can be read by card reader 15. In yet another embodiment, a service window application can be used to enter player tracking account information.

In other embodiments, the EGM 2 can be configured to detect nearby PEDs for the purposes of initiated an attract feature that encourages the player to engage in game play at the EGM 2. Thus, the EGM 2 can be aware of nearby PEDs associated with users not using the EGM 2. These PEDs may be associated with patrons walking near the EGM 2, standing near the EGM 2 or playing a game on a nearby gaming machine. The ability to detect or be made aware of nearby PEDs can be provided independently of whether attract features are provided.

In general, when a nearby PED is detected or the EGM 2 is made aware of a nearby PED (e.g., another device may detect the presence of the PED and transmit the information to the EGM), the EGM 2 may attempt to establish communications with the device. In one embodiment, the EGM 2 can be configured to contact and attempt to access the wide area network capabilities of a PED. For instance, the EGM 2 can be configured to contact a PED associated with a player utilizing the EGM 2 use the wide area network capabilities of the PED to communicate with a remote device, such as a remote server.

During game play, the EGM 2 can be configured to send information to the PEDs, such as 14 or 16, that is for a player's personal use. For instance, the EGM 2 can be configured to send a copy of a screen displayed on 25 or 26 showing the outcome of the game or a bonus game. The player can save this screen copy as a keepsake and may optionally upload it to a social media site. Further, the EGM 2 can be configured to receive information from the PED that affects the game play. For instance, the EGM 2 can be configured to receive player tracking information, voucher information and/or player preference information that allows the gaming experience to be customized for a particular player. Thus, the EGM 2 can be configured to interact with a PED to send data intended for storage on the PED as well as to send data to the PED that is intended for a remote device.

The EGM 2 can be configured to detect PEDs carried by employees of the gaming operator that move throughout the casino floor. In one embodiment, the EGM 2 can be configured to contact these devices for the purposes of utilizing their network access capabilities. These devices can transmit information that allows them to be identified by the EGM 2. In one embodiment, the EGM 2 can be configured to only utilize specially designated devices, such as devices carried by operator employees for the purposes of accessing and engaging in communications with devices on a wide area network, such as the Internet. In yet another embodiment, which is described in more detail below, user devices can be required to have a particular application installed, such as an application provided by the gaming operator, before the PEDs can be utilized for accessing a wide area network.

In yet another embodiment, a wireless or wired interface can be located within the EGM cabinet that can be used to communicate with a PED. The EGM 2 can be configured such that the wireless or wired interface is only activated when the interior of the EGM 2 has been accessed in an authorized manner The EGM 2 may be configured to only permit communications via this interface when the EGM 2 is an operator mode, such as when the cabinet has been opened via an approved procedure. At other times, the EGM 2 may not be configured to communicate with remote device via a wide area network.

Communications Topologies in a Gaming System Including Portable Electronic Devices In this section, different communication topologies involving PEDs in a gaming system are described. In one embodiment, PEDs, such as 14 or 16, can communicate directly with the EGM. For example, as described above, the communications can be through a wired or wireless interface available on the EGM. Via an EGM to PED communication interface, the PED may be able to communicate with the game controller on the EGM, a secondary controller on the EGM, a remote device, such as server 4 or combinations thereof. Examples of a secondary controller include but are not limited to a player tracking controller, a card reader controller, a bill validator controller or a printer controller. In the case of the remote device, such as server 4, the EGM 2 can act as an intermediary in the communications.

In one embodiment, for security purposes, the EGM 2 can be configured to not allow direct communications between the game controller and the PED. For example, the PED may communicate with a secondary controller in a secondary device coupled to the EGM, such as a card reader controller in a card reader. The secondary controller may include a communication interface that allows it to communicate with a remote device, such as server 4. In a particular embodiment, the communications between the secondary controller and the game controller can be well defined to limit the type of information that is transferred the secondary controller and the game controller. Depending on how the communications are defined, the EGM 2 may be able to receive a limited types of information or not any information from the PED via the secondary controller.

In another embodiment, the communications between the PED and the EGM 2 can be uni-directional. For example, the EGM can be configured to directly send information to the PEDs, such as 14 or 16, but not directly receive information from the PED. In one embodiment, information can be sent from a PED to an EGM 2 via an intermediary device, such as server 4 or a secondary device, such as card reader 15. The intermediary device can be configured to screen and limit the information from the PED that can be received by the EGM 2.

In yet other embodiments, the EGM 2 and the PEDs may only communicate indirectly using the communication capabilities associated with a PED. For example, PEDs may be able to establish communication connection with server 4 which then acts as intermediary for communications between the PEDs, such as 14 and 16, and EGM 2. The EGM 2 can be configured to output information via a display device or some other mechanism that enables the indirect PED to EGM communications via an intermediary device, such as server 4, via a local area network, such as 6, or via a wide area network, such as 52. For example, the EGM can be configured to output a QR code that a PED can scan. Information embedded in the QR code can allow the PED to establish communications with the EGM 2 via server 4, local area network 6 or wide area network 52.

The PEDs can communicate with a device, such as server 4, using one of its inherent communication capabilities. The mode of communication that is used can vary depending on the communication networks 50 that are available to the PEDs. For example, the server 4 and EGM 2 can be located on a local area network, such as a local area network 6 within a casino. The local area network can be a private network only accessible from the casino and its vicinity. Via wireless access point 54, the PED can access the local area network, such as 6 to access the server 4 or optionally EGM 2. Thus, via wireless access point 54, the PED may be able to communicate with 1) a server 4, 2) an EGM 2 where the server 4 acts as intermediary in the communications or 3) directly with the EGM 2 via the local area network 6.

In other embodiments, the server 4 and/or the EGM 2 can access a wide area network, such as the Internet 52 and have an Internet address. Via the wireless access point 54 or a cellular data connection 56, the PED, such as 14 or 16, can access the Internet 52 to establish communications with server 4 or EGM 2. Again, the server 4 can act as intermediary in the communications between the PED and the EGM 2. Thus, the PEDs can establish communications with server 4 via the Internet 52 and then, the server 4 can establish communications with the EGM 2 using an alternative method.

In various embodiments, different EGMs in a gaming system can be provided with different communication capabilities. Thus, a combination of the communication topologies used above can be used for communications between PEDs and EGMs in a gaming system. For instance, a PED can communicate with a first EGM via a direct wireless connection between the first EGM and the PED and then communicate with a second EGM via a wireless access point that connects to a local area network on which the second EGM is located.

Entering Sensitive Information for an Electronic Gaming Machine from a Portable Electronic Device In accordance with the present invention, details of EGMs, gaming systems and the Portable Electronic Devices (PED) are described with respect to FIGS. 1, 2A-2D, and the flow diagrams of FIGS. 3A and 3B. Initially, a player/patron may initiate a transaction on an EGM 2 that requires the input of Sensitive Information (SI) in order to further continuance of that transaction. Such secure transactions, for example, include, but are not limited to, the commencement or continuance of game play, player tracking transactions, accounting transactions, cash-outs, cash transfer transactions, player club operation transactions or an enrollment transaction for a promotion, etc.

Due in part to the close proximity of the EGMs relative to one another, some patrons are reluctant to enter their SI in front of other patrons, and may elect to forego participation on the EGM all together. Accordingly, by enabling the input of such SI directly onto their own PED (e.g., PED 14, which will be the only one discussed henceforth for the ease of description), which is in direct communication with the EGM, such input is significantly more discrete, and out generally of the plain view of other patrons.

Once a transaction has been initiated on the EGM 2, depending upon the specific transaction requiring player information, the EGM and/or system server 4 will determine whether or not the player information is SI or not. Should the required player information not be determines SI, the EGM 2 may enable input of such information directly on the EGM using the player input panel 28 and/or other input controls.

In accordance with the present invention, however, should the required player input information include SI, then the communication between the EGM (and/or system server 4) and the PED 14 may commence in order to enable input of the SI data directly on their PED (E.g., FIGS. 2A-2D). In one embodiment, to establish communication, the player/patron may simply execute a mobile app from their PED that was previously downloaded from one of the various mobile application sites, depending upon whether the mobile OS is Apple, Android, Blackberry, Palm or Microsoft based, etc. Using such an executable application installed on the mobile device that enables aforementioned SI input features, the EGM can effectively communicate with the mobile application to enable the SI exchanged.

In other embodiments, an installed mobile application may not be desirable given the various mobile device platforms (e.g., Android, Iphone, etc.) or the player/patron simply not wanting a gaming application on their PED. In these versions, the EGM 2 and/or the system server 4 could commence communication with the PED 14 using at least two different technologies. Appling a standard communication protocol/technology, the EGM can communicate directly with the PED's web browser, using HTML. For example, once Player/Patron has entered the SI into the PED, the SI is forwarded to the EGM through HTML using the PED's web browser.

Another applicable communication technology that can be applied, without the need for a mobile application, involves the use of standard communication protocol/technology between the EGM 2, PED 14 and system server 4, wherein the server is further in communication with a third party server. For instance, EGM 2 communicates with Server 4, notifying the server to permit the PED 14 to communicate and connect to the EGM/Server so that SI can be entered via the PED. Next, the EGM/Server, forwards a standard URL to the mobile device which could be the address for a simple web site on system Server 4. The PED can then connect to the Server 4, via HTML provided by the EGM 2.

Using the latter technique, by way of example, once communication is established, the player then enters the SI into the web page hosted by the Server (via the PED). The information entered by the player is communicated to the mobile device either 1) directly from the Server to the EGM, or 2) it could be provided to the mobile device and the mobile device communicates that back to the EGM. Direct communication between the PED and the Server 4 is preferred in that communication path doesn't require that an application be installed on the PED.

Referring now to FIGS. 2A-2D, once communication between the PED 14 and the EGM/Server has commenced and been established, using at least one of the above mentioned techniques and technologies, a Greet Screen 102 (e.g., FIG. 2A) can be formatted and output to the PED 14 for viewing on the PED's display 100. In one configuration, the resolution, size, aspect ratio, etc., of the SI input screens of FIGS. 2A-2D, can be formatted and output in a lower quality, more universal format that is capable of being displayed on a wide range of PED displays 100, regardless of the display's resolution, size, aspect ratio, etc.

Alternatively, the EGM/Server can customize, adjust and/or scale the resolution, size, aspect ratio, etc. of the outputted SI input screens, of FIGS. 2A-2D, to match those of the particular display screen of the PED. Such screen customization, of course, is the more aesthetically pleasing.

Referring back to FIG. 2A the initial Greeting Screen 102 can be rendered and output to the PED for viewing on the display 100. Should the player/patron be identified, a customized greeting message 104, such as "Welcome to Casino Mr. Anderson" can be included. It will be appreciated that any other greeting can be incorporated of course.

A general query to input the SI data is also prominently placed on the Greeting Screen 102. This facilitates the ease of input and use by the player/patron, informing them what input SI data is required. For example, the Greeting Screen 102 includes a request to "Please enter PIN on Your Mobile Device" message 106. Briefly, in the examples of FIGS. 2A-2D, the requested SI data for input is a PIN although it will be appreciated that any form of SI could be requested. As mentioned, such input SI data includes, but is not limited to, the patrons account, name, address, social security, password, phone number, biometric input, etc. or any other personal identification information.

Depending upon the type of PED and its' input controls (i.e., whether the device includes a hard numbered keypad, a keyboard, a touch sensitive display and/or combination thereof), how the actual entrance of the input SI data may vary from device to device. In the examples of FIGS. 2A-2D, the PED 14 incorporates a full touch screen style input. Therefore, to advance to the next input screen, the patron may have to contact the "Press to Start" message 108 or some other form for screen continuance.

Figure 2A:
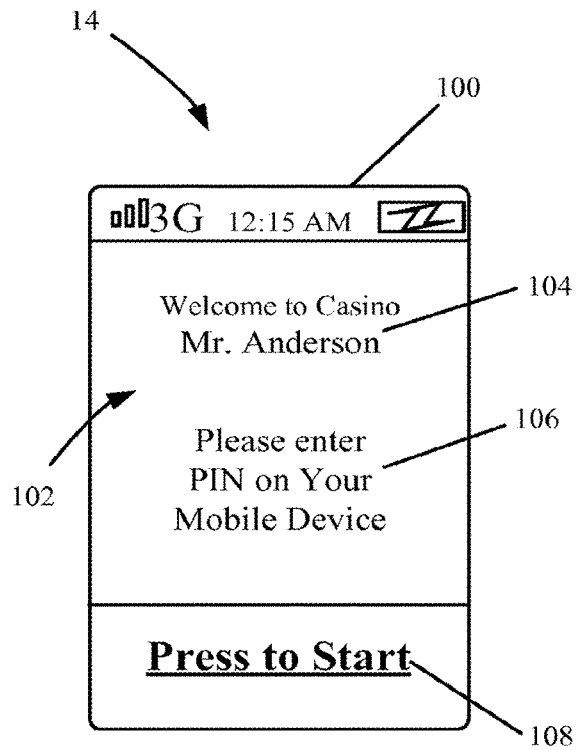
FIGS. 2A-2D are block diagrams illustrating mobile or portable electronic screen displays that enable the input of sensitive data for an EGM from the mobile or portable electronic device itself in accordance with the described embodiments.
Figure 2B:
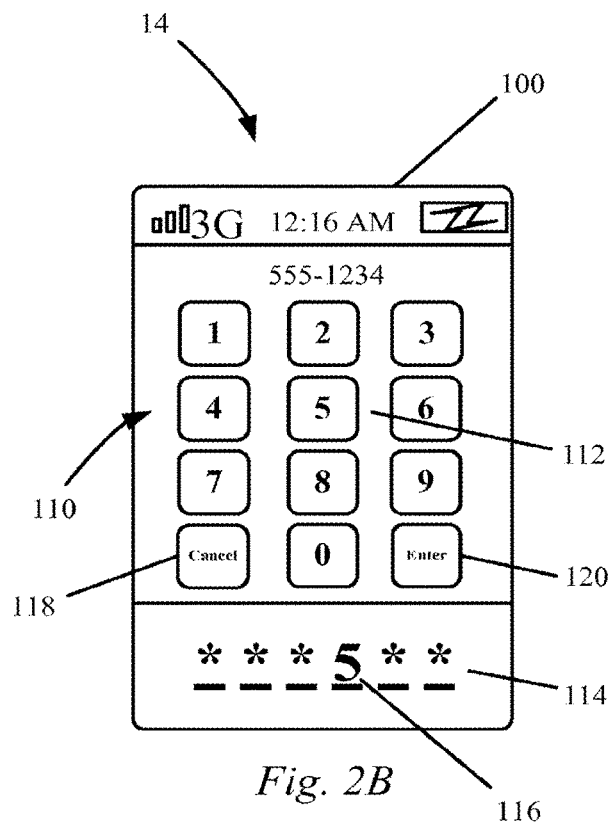
Figure 3A:
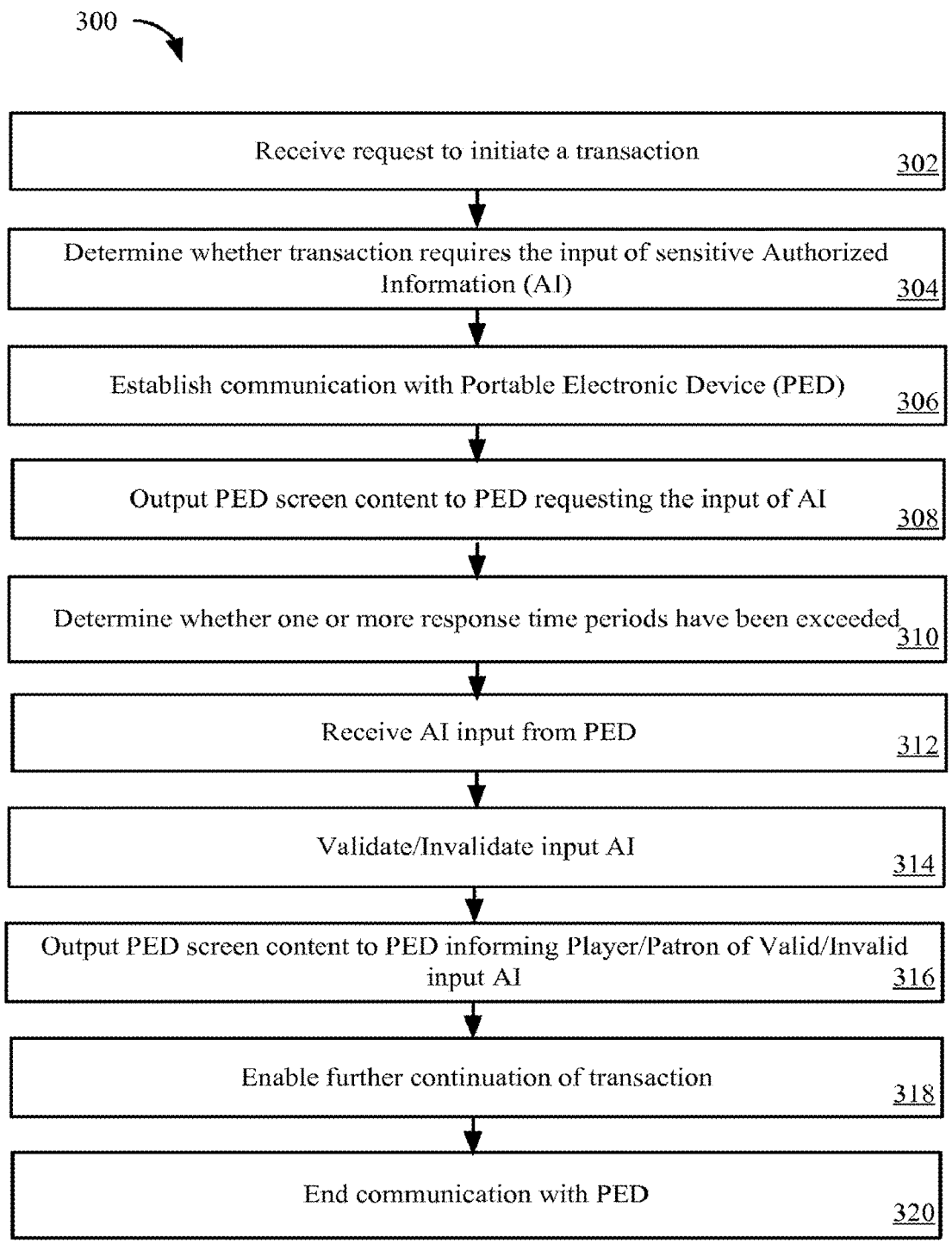
FIG. 3A is a method in a gaming machine involving the input of personal SI directly from the portable electronic device for use in the EGM transactions in accordance with the described embodiments.
Figure 3B:
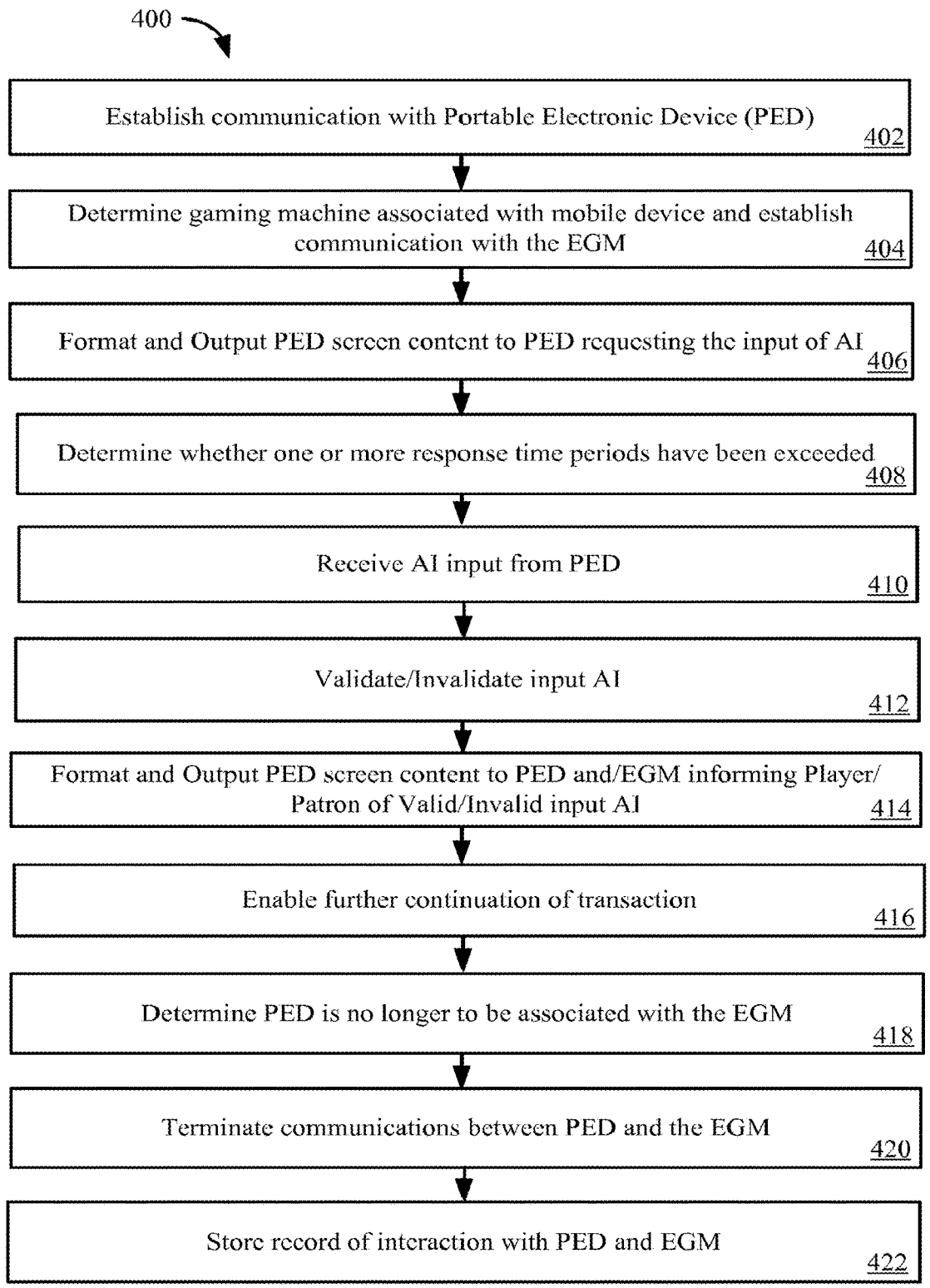
FIG. 3B is a method in a server involving the input of personal SI directly from the portable electronic device for use in server/EGM transactions in accordance with the preferred embodiments.

Advancing from the Greet Screen 102 (FIG. 2A) to the SI Input Screen 110 of FIG. 2B, a touch screen number keypad 112 (or a keyboard depending upon what input SI may be required) may be illustrated. Below the keypad 112 on PED display 100 is an SI display region 114 for display of the input SI data, whether it requires numbers, letters, symbols, biometric data or a combination thereof. In the SI display region 114 of FIG. 2B, for example, six data slots are illustrated, the number of which can vary of course.

To further hide or shield entry of the sensitive input SI data in the input slots, even though such input SI data is entered for viewing only on the smaller display 100, each entry may only be presented momentarily (i.e., the fourth data slot 116) before being replaced by a "*" symbol or the like.

A "Cancel" button 118 or a "Backspace" button (not shown) may be incorporated to correct any input errors or to "cancel" the SI input altogether. However, should the player/patron complete their input SI data entry, they may execute the "Enter" button 120 (or similar means) to transmit and output the input SI data to the EGM/Server.

Figure 2C:
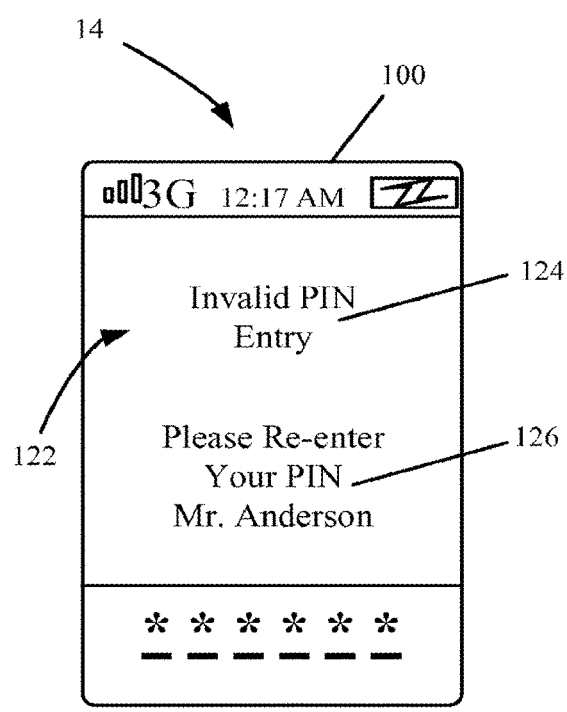

Applying conventional validation/invalidation comparison technology, the validation of the input SI data may be assessed. Should the input SI data be determined "Invalid" for whatever reason, an Invalidation Screen 122 may be rendered on the PED display 100, as shown in FIG. 2C. A simple invalidation message such as an "Invalid PIN Entry" message 124 can be displayed for information, as well as a "Please Re-enter Your PIN" message 126 before reverting back to the SI input Screen 110 as best viewed in FIG. 2B. The Player/Patron may then reenter their sensitive input SI data again.

In one specific embodiment, the validation could be performed in-part on the PED itself. Using HTML, the client on the PED performs partial validation of the data, and then the server still requires validation. For example the client might prompt the Play/Patron for a number, which may relate to the Play/Patron's age. The client on the PED compares the PED stored number to the input SI (e.g., only validating when values 0 through 9 are entered and not when letters are entered). The client, for instance, might even check that the input age is greater than one and less than 150. The server would likely perform the same check but also compare the age against a database for the user.

Similar to other forms of sensitive personal identification information, should an invalid entry continue a predetermined number of attempts (e.g., 4 or 5 consecutive attempts), the system may "lock-out" further entry of input SI data from that PED for a predetermined period of time or until other circumstances are met. These other circumstances may include a password or pass code reset or other verification techniques.

Figure 2D:
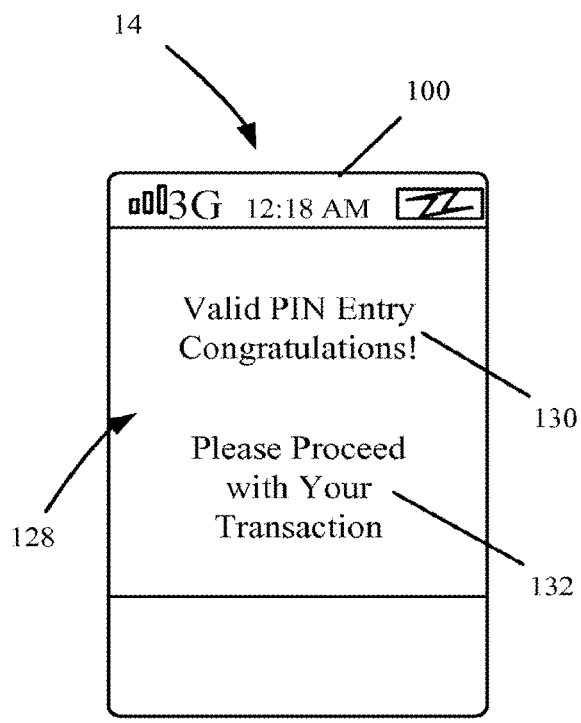

Should the input SI data be determined "Valid" by the EGM/Server, a Validation Screen 128, such as that shown in FIG. 2D, may be rendered on the PED display 100. Again, a simple validation message may be displayed such as a "Valid PIN Entry Congratulations!" message 130. Once the Player/Patron has been informed of their validation, they may proceed with the furtherance of their transaction, either on the PED itself or on the EGM. For instance, the Player/Patron may be informed of such furtherance by a "Please Proceed with Your Transaction" message 132 on the PED display 100.

In one configuration, should the SI input cycle be complete, the EGM/Server, or the PED mobile application, may timeout, reverting the PED back to the home screen or the like. Moreover, should the Player/Patron be required to reenter the input SI data on their PED, such in SI data may be stored, and automatically complete entry of the input SI data in the data slots of the SI display region 114.

Methods in an EGM and Server

Next details of a method on an EGM and server involving the input of Sensitive Information (SI) for the EGM on a Mobile or Portable Electronic Device (PED) are described. FIG. 3A, for instance, illustrates a method 300 in an EGM for entering such SI from the PED. In 302, a request is received from an EGM 2 (FIG. 1) to initiate a transaction. For instance, the player/patron at the EGM 2 may operate the player input panel 28, including buttons for making inputs associated with the play of the wager-based game, to request any information. Some requested information and transactions may not require the input of SI data, to further continue the transaction, such as dining requests, game selection, game operation, chatting, beverage selection or browsing casino offerings. However, as mentioned above, many transactions do require the input of SI, such as the play of communual games, player tracking transactions, accounting transactions, cash-out transactions, mobile money transfers transaction, general account settings transactions, and/or password or pass code recovery transactions, etc.

Accordingly, at 304 of FIG. 3A, the EGM can analyze the requested transaction to determine whether or not the input of SI is even necessary, in this instance. That is, should the requested transaction not require SI, then the EGM can permit the completion of the transaction through the operation of the controls on the input panel 28.

However, in accordance with the present invention, should the requested transaction require the input of SI data, at 306, communications can be established with a PED. In one embodiment, a secure pairing between the PED and the EGM can be established using a protocol such as Bluetooth™ or Wi-Fi. If present, an NFC enabled communication interface on the EGM can be used to transfer information that allows a secure pairing to be established. In another embodiment, communications between the mobile device and the EGM can be enabled via an intermediary device. For instance, communications can first be established between a mobile device and a remote server and then communications can be established between the remote server and the EGM such that information can be transmitted between the EGM and the mobile device.

After the initial communications are established, the EGM and mobile device can exchange information. In one specific configuration, the Greet Screen 102 or interface of FIG. 2A, for example, may be output to the PED 14. In 308 of FIG. 3A, the screen resolution, aspect ratio, font size, etc., may be adjusted by the EGM, depending upon the particular screen display properties of the PED. Upon receiving a continuation signal (e.g., press of the "Start" region 108), the EGM can output the SI Input Screen 110 of FIG. 2B.

In either event, a predetermine response time period will commence once each screen is output to the PED for viewing on the PED display 100. In 310 of FIG. 3A, thus, the EGM 2 will determine whether one or more response time periods have been exceeded. Should the Player/Patron fail to input any information or fail to input any key stroke on the PED display after the predetermined time period (e.g., 2 minutes), the EGM will automatically "timeout", ending the transaction. In one embodiment, the system can inform the Player/Patron of the "timeout" on the PED display and/or the EGM display, and then perhaps revert to the EGM Home Screen or in the like.

Similarly, in the event of a failed or broken communication between the EGM and the PED, the EGM will also "timeout", ending the transaction. In this event, the EGM may again similarly inform the Player/Patron of the failed or broken communication on the EGM display, and then perhaps revert to the EGM Home Screen or in the like.

In 312, after the Player/Patron has entered their input SI data into the data slots of the SI display region 114, and transmitted the data, the input SI data is received by the EGM 2. As mentioned, input SI data may relate to any passwords, pass codes, address, social security, account numbers, biometric information, etc, and may be in the form of number, letters, symbols, fingerprints, retina scans, etc.

At 314, the "received" input SI data is Validated or Invalidated, using conventional comparison software and technology. Stored SI data, upon which the input SI data is compared against, will likely be accessed by the EGM, via communication with the system server 4.

Referring back to FIG. 2C, should the "received" input SI data be determined "Invalid", at 316, the EGM will output screen content to the PED 14, informing the Player/Patron of the invalid input SI data entry (Invalidation Screen 122). Subsequently, the EGM 2 will output the SI Input Screen 110 back to the PED, at 308.

In the event that the "received" Input SI is determined valid, at 314, the EGM will output screen content to the PED 14, informing the Player/Patron of the valid input SI data entry, at 316 (i.e., Validation Screen 128 of FIG. 2D). Subsequently, the EGM 2 will permit further continuation of the transaction, at 318. In 322, the communication with the PED can be ended.

As described above, a remote system server 4 can act as a communication intermediary between an EGM and a mobile device. In addition, the server can be configured to perform operations that allow SI data to be input and entered from a PED 14. FIG. 3B is a method 400 in a system server 4 involving the entrance of Sensitive Information (SI) data on a Portable Electronic Device (PED), for a transaction on an EGM 2. In 402, the server can establish communications with a PED. The server can be located on a casino area network which is internal to the casino. The casino area network can be isolated from external networks such as the Internet.

In 404, the server 4 can determine whether an EGM is associated with the PED, and establish communications that allows information to be transmitted between the PED and the EGM. For instance, the server can receive a request from the EGM to establish communications with the PED in response to detecting a presence of the PED.

At 406, a similar Greet Screen 102 or interface (e.g., FIG. 2A) may be formatted and output by the server 4 to the PED 14. For instance, once the initiated transaction has been determined to require the input of SI, the server can format the screen resolution, aspect ratio, font size, etc., depending upon the particular screen display properties of the PED (or format a standard output screen). Upon receiving a continuation signal (e.g., press of the "Start" region 108 of FIG. 2A, the server 4 can output the SI Input Screen 110 of FIG. 2B.

A predetermine response time period will commence, at 408, once each screen is output to the PED for viewing on the PED display 14. The server 4 will determine whether one or more response time periods have been exceeded, and should the Player/Patron fail to input any information or fail to input any key stroke on the PED display after the predetermined time period (e.g., two minutes) has been exceeded, the server will automatically "timeout", ending the transaction. Similar to the EGM methodology, the system server can inform the Player/Patron of the "timeout" on the PED display and/or the EGM display, and then perhaps revert to the EGM Home Screen or in the like.

In 410, after the Player/Patron has entered their input SI data into the data slots of the SI display region 114, and transmitted the data, the input SI data is received by the server 4. The "received" input SI data is Validated or Invalidated, at 412, by the server using conventional comparison software and technology, and compared the input SI data to the stored SI data stored on the server.

Should the "received" input SI data be determined "Invalid", at 412, the system server 4 will output screen content to the PED 14, informing the Player/Patron of the invalid input SI data entry (Invalidation Screen 122). Subsequently, the server 4 will output the SI Input Screen 110 back to the PED, at 406.

In the event that the "received" Input SI data is determined valid, at 412, the server will output screen content to the PED 14, informing the Player/Patron of the valid input SI data entry (i.e., Validation Screen 128 of FIG. 2D). Subsequently, the server will permit further continuation of the transaction, at 416.

In 418, the server can determine the PED is no longer to be associated with the EGM. For instance, the server can make this determination based upon a request from the EGM to terminate the communication session between the PED and the EGM or the server can determine that the PED is no longer in the vicinity of the EGM via some mechanism. In 420, the server can terminate communication link between the EGM and the PED. At 422, the server can store a record of the communication that it enabled between the PED and the EGM. Subsequently, the method can return to step 404 while communications are still being maintained with the PED.

Gaming Devices and Systems

Figure 4:
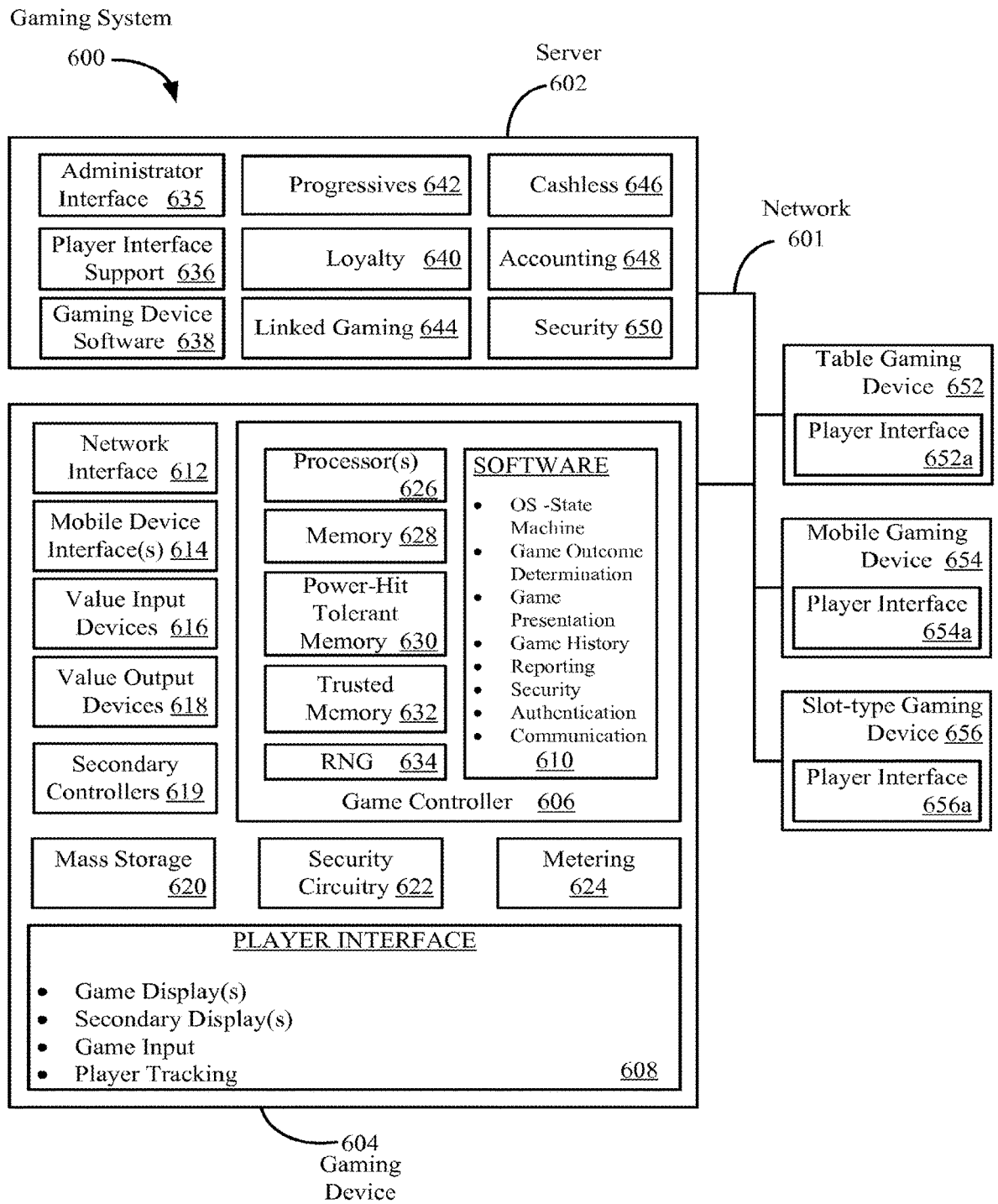
FIG. 4 shows a block diagram of a gaming device in accordance with the described embodiments.
Figure 5:
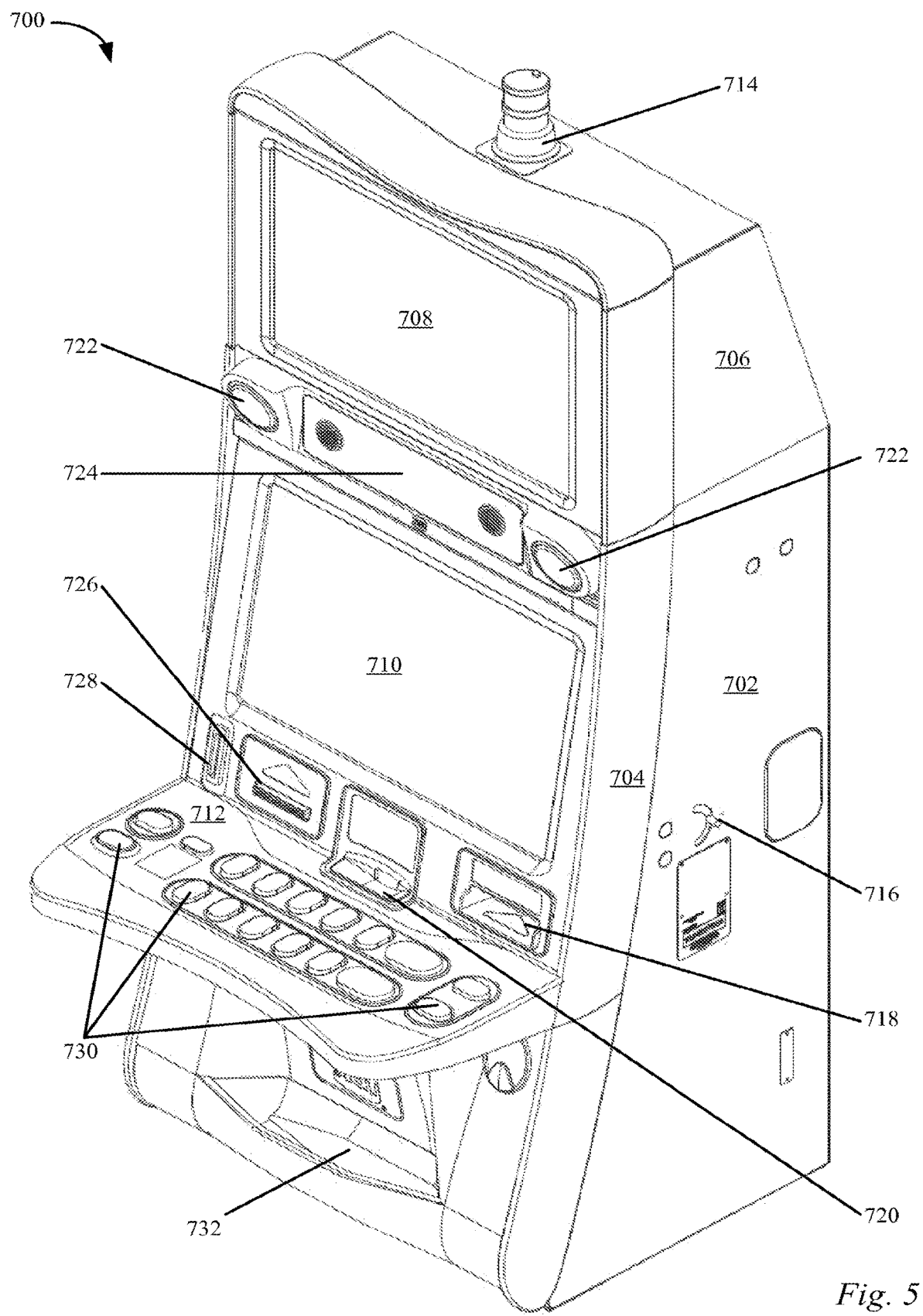
FIG. 5 shows a perspective drawing of a gaming device in accordance with the described embodiments.

Next additional details of EGMs and gaming systems are described with respect to FIGS. 4 and 5. FIG. 4 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652a, 654a and 656a, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administrator interface 635 that allows functions associated with the server 602 to be adjusted.

An example configuration of a gaming device is described with respect to gaming device 604. The gaming device 604 can include 1) a game controller 606 for controlling a wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories. Other types of memories, such as Flash memory, can also be utilized as an unalterable memory and the example of an EPROM or EEPROM is provided for purposes of illustration only.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes for a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the PED, such as an input indicating a wager amount and/or an input to initiate the game. This information can be sent from the PED to a remote device, such as from mobile gaming device 654 to server 602. After receiving the game outcome from the remote device, a game presentation for the game outcomes generated remotely can be generated and displayed on the PED. In some instances, the game presentation can also be generated remotely and then streamed for display to the PED.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaming device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) PEDs carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, California, can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a PED interface or interfaces, such as 614, can be provided for communicating with a PED, such as a cell phone or a tablet computer carried by players or casino personnel temporarily in the vicinity of the gaming device 604. A wireless communication protocol, such as Bluetooth™ and a Wi-Fi compatible standard, can be used for communicating with the PEDs via the PED interfaces 614. In one embodiment, the PED interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the PED and/or providing power to the PED.

Near field communication, or NFC, allows for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, a smartphone or tablet with an NFC chip can make a credit card/debit card payment to a gaming device or serve as keycard or ID card for a loyalty program. Further, an NFC device can act a hotel room key. The user of an NFC device as a hotel room keys and/or a player tracking card instrument may allow fast VIP check-in and reduce staffing requirements.

NFC devices can read NFC tags on a gaming device 604 to get more information about the gaming device including an audio or video presentation. For instance, a tap of an NFC enabled device to a gaming device can be used to instantly share a contact, photo, song, application, video, or website link. In another example, an NFC enabled device can be used to transfer funds to the gaming device or enter the player in a multi-player tournament. As another example, an NFC enabled device can be used to receive information from a gaming device that can be used in a persistent gaming application or a social media application.

Further, NFC enabled signage can include NFC tags that allow a patron to learn more information about the content advertised in the signage. The NFC enabled signage can be part of a gaming system. For instance, a sign advertising a show available at the casino can be configured to transfer information about the show, show times and ticketing information via an NFC tag. As another example, a sign showing jackpot information, such as progressive jackpot information, can be used to transfer information about the jackpot, such as the last time the jackpot was won and where it was won.

In one embodiment, an NFC interface on a gaming device can be used to set-up a higher speed communication between the gaming device and another NFC enabled device such as smart phone. The higher speed communication rates can be used for expanded content sharing. For instance, a NFC and Bluetooth enabled gaming device can be tapped by an NFC and Bluetooth enabled smart phone for instant Bluetooth pairing between the devices. Instant Bluetooth pairing between a gaming device and an NFC enabled device, such as a smartphone, can save searching, waiting, and entering codes. In another example, a gaming device can be configured as an NFC enabled router, such as a router supporting a Wi-Fi communication standard. Tapping an NFC enabled device to an NFC enabled and Wi-Fi enabled gaming device can be used to establish a Wi-Fi connection between the two devices.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 604. Typically, the indicia of credit can be exchanged for cash. For instance, the indicia of credit can be exchanged at a cashier station or at a redemption station. Examples of value output devices can include a network interface for transferring credits into a remote account, a wireless communication interface that can be used with a PED implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the PED. The PED can be used to access the account and affect the account balance via game play initiated on the PED. Credits can be deposited or withdrawn from the remote account via some mechanism other than via the PED interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a PED has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaming system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

The "service window" application can be generated by software code that is executed independently of other game controller software in a secure "sandbox." Via the sandbox, an executable can be given limited access to various resources on an EGM, such as a portion of the CPU resources and memory available on a game controller. The memory can be isolated from the memory used by other processes, such as game processes executed by the game controller.

As described above, a service window application can be allowed to control, send and/or receive data from secondary devices on a gaming device, such as a video display, a touch screen power interfaces or communication interfaces. A service window application allowed to utilize a communication interface, such as a wireless communication interface, can be configured to communicate with a PED via the communication interface. Thus, a service window application can be configured to implement attract features as described above independently of a game controller on an EGM. Further details of utilizing a service window on a gaming device on an EGM are described in U.S. patent application Ser. No. 12/209,608, by Weber et al., filed Sep. 12, 2008, titled "Gaming Machine with Externally Controlled Content Display," which is incorporated herein by reference in its entirety and for all purposes.

In another embodiment, via the video display, the service window application can be configured to output data in an optical image format, such as a 1-D/2-D bar-code or a QR code. The optically formatted data can be captured by a camera on the PED. For instance, a receipt indicating the acceptance of a virtual ticket voucher or virtual currency on the gaming device can be displayed in the service window in a QR code format and transferred to a user's PED via an image capture device on their PED. In another embodiment, virtual ticket voucher information can be transferred to a PED as optically formatted image data.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 5 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 4, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 5, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 5 is provided for illustrative purposes only. For instance, some of the devices coupled to the main cabinet 702, such as printer 726, can be located in a different top box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

The invention claimed is:

1. A system comprising:
    an application storing authentication information associated with a player, the application being executable by a mobile device;
    a network interface;
    a processor independent of a game controller of an electronic gaming machine; and
    a memory device that stores a plurality of instructions that, when executed by the processor, cause the processor to:
        detect if a mobile device is within a designated range of a housing of the electronic gaming machine,
        responsive to the mobile device being detected to be within the designated range of the housing of the electronic gaming machine:
            generate a number, and
            cause the generated number to be wirelessly transmitted to the mobile device, and
        following an authentication of the generated number:
            transmit, via the network interface, the authentication information to a remote server, and
            perform, in cooperation with the remote server, a player tracking function.

2. The system of claim 1, wherein the performance of the player tracking function comprises causing information relating to player activity to be stored, at the remote server, in a player tracking account associated with the player.

3. The system of claim 2, wherein the player tracking function comprises:
    tracking an amount wagered by the player at the electronic gaming machine, and
    storing the tracked amount wagered in association with the player tracking account.

4. The system of claim 2, wherein the player tracking function comprises:
    tracking an amount won by the player at the electronic gaming machine, and
    storing the tracked amount won in association with the player tracking account.

5. The system of claim 1, wherein the performance of the player tracking function comprises causing information relating to player activity to be stored at the mobile device.

6. The system of claim 1, wherein the authentication of the generated number is based on the generated number matching another number generated distinct from the device.

7. The system of claim 1, wherein data is wirelessly received from the mobile device after the generated number is wirelessly transmitted to the mobile device.

8. The system of claim 7, wherein the data comprises the stored authentication information.

9. The system of claim 7, wherein the memory device stores a plurality of further instructions that, when executed by the processor, cause the processor to automatically log in the player responsive to the data received from the mobile device being associated with the generated number.

10. The system of claim 9, wherein the player is automatically logged into the remote server.

11. The system of claim 9, wherein the player is automatically logged into the electronic gaming machine.

12. The system of claim 1, wherein the generated number expires after a period of time.

13. A system comprising:
    an application storing authentication information associated with a user, the application being executable by a mobile device;
    a network interface;
    a processor independent of a game controller of an electronic gaming machine; and
    a memory device that stores a plurality of instructions that, when executed by the processor, cause the processor to:
        detect if the mobile device is within a designated range of a housing of the electronic gaming machine,
        responsive to the mobile device being detected to be within the designated range of the housing of the electronic gaming machine:
            generate a number, and
            cause the generated number to be wirelessly transmitted to the mobile device, and
        following an authentication of the generated number:
            cause a transmission, to a remote server, of the stored authentication information to automatically log in the user, and
            cause the game controller of the electronic gaming machine to increase a credit meter of the electronic gaming machine based on an amount of credits from the remote server.

14. The system of claim 13, wherein the amount of credits from the remote server are from an account maintained by the remote server in association with the user.

15. The system of claim 13, wherein the authentication of the generated number is based on the generated number matching another number generated distinct from the device.

16. The system of claim 13, wherein data is wirelessly received from the mobile device after the generated number is wirelessly transmitted to the mobile device.

17. The system of claim 16, wherein the data comprises the authentication information.

18. The system of claim 16, wherein the memory device stores a plurality of further instructions that, when executed by the processor, cause the processor to automatically log in the user.

19. The system of claim 18, wherein the user is logged in responsive to the data received from the mobile device being associated with the generated number.

20. The system of claim 13, wherein the user is automatically logged into the remote server.

21. The system of claim 13, wherein the user is automatically logged into the electronic gaming machine.

22. The system of claim 13, wherein wirelessly transmitting the generated number to the mobile device includes emitting near-field radio waves.

23. The system of claim 13, wherein the generated number expires after a period of time.

24. The system of claim 1, wherein the wireless transmission of the generated number occurs independent of any content being displayed by any display device.

25. The system of claim 13, wherein the wireless transmission of the generated number occurs independent of any content being displayed by any display device.

* * * * *